US008503675B2

(12) United States Patent
Bauer et al.

(10) Patent No.: US 8,503,675 B2
(45) Date of Patent: Aug. 6, 2013

(54) CABLE TELEVISION SECURE COMMUNICATION SYSTEM FOR ONE WAY RESTRICTED

(75) Inventors: William D. Bauer, Gering, NE (US); Donovan Steve White, Poway, CA (US); David W. Eder, Bozeman, MT (US)

(73) Assignee: Beyond Broadband Technology, LLC, Tyler, TX (US)

( * ) Notice: Subject to any disclaimer, the term of this patent is extended or adjusted under 35 U.S.C. 154(b) by 931 days.

(21) Appl. No.: 12/599,499

(22) PCT Filed: Feb. 24, 2009

(86) PCT No.: PCT/US2009/035027
§ 371 (c)(1),
(2), (4) Date: Nov. 9, 2009

(87) PCT Pub. No.: WO2010/098745
PCT Pub. Date: Sep. 2, 2010

(65) Prior Publication Data
US 2010/0262988 A1    Oct. 14, 2010

(51) Int. Cl.
*H04N 7/167* (2011.01)
(52) U.S. Cl.
USPC .............. 380/210; 725/26; 380/281; 380/284
(58) Field of Classification Search
USPC ............................ 725/26; 380/281, 284, 210
See application file for complete search history.

(56) References Cited

U.S. PATENT DOCUMENTS

| | | | |
|---|---|---|---|
| 3,882,485 A | 5/1975 | Bluestein et al. | |
| 4,090,217 A | 5/1978 | Goyal et al. | |
| 4,531,020 A | 7/1985 | Wechselberger et al. | |
| 4,531,021 A | 7/1985 | Bluestein et al. | |
| 4,613,901 A | 9/1986 | Gilhousen et al. | |
| 5,862,223 A | 1/1999 | Walker et al. | |
| 6,157,719 A | 12/2000 | Wasilewski et al. | |

(Continued)

FOREIGN PATENT DOCUMENTS

| DE | 10053751 A1 | 4/2002 |
|---|---|---|
| FR | 2902585 A1 | 12/2007 |

OTHER PUBLICATIONS http://www.highbeam.com/doc/1P3-2130767651.html, "WIPO assigns patent to Beyond Broadband technology for Cable Televsion Secure Communication System for one way restricted acces", Sep. 2, 2010.*
FIPS 197, Advanced Encryption Standard (AES), Nov. 26, 2001.

(Continued)

*Primary Examiner* — April Y Blair
(74) *Attorney, Agent, or Firm* — Santangelo Law Offices, P.C.

(57) ABSTRACT

Methods and apparatus permit a one-way downloadable security for electronic signals such as cable television, free-to-air, direct broadcast satellite, electronic device enablement, and other services. The system can allow a broadcast transmission capability (1) to provide an encrypted signal to an individual reception capability (2) in a manner that maintains the full security of a traditional decryption key process while completely eliminating any need for a trusted authority. By including a nascent decryption key generator that may create a secure, key-based environment from an unsecure individualized information transmission (12), a sequence of key(s) from a root key(s) to a derived key(s) to a temporary key(s) and ultimately to a fully random key(s) can be generated in activating a device or a decryption capability for a subscriber.

202 Claims, 7 Drawing Sheets

U.S. PATENT DOCUMENTS

| | | |
|---|---|---|
| 6,272,152 B1 | 8/2001 | Levin et al. |
| 6,449,719 B1 | 9/2002 | Baker |
| 6,965,993 B2 | 11/2005 | Baker |
| 7,007,170 B2 | 2/2006 | Morten |
| 7,043,473 B1 | 5/2006 | Rassool et al. |
| 7,150,045 B2 | 12/2006 | Koelle et al. |
| 7,165,175 B1 | 1/2007 | Kollmyer et al. |
| 7,299,292 B2 | 11/2007 | Morten et al. |
| 7,328,345 B2 | 2/2008 | Morten et al. |
| 7,349,886 B2 | 3/2008 | Morten et al. |
| 7,356,143 B2 | 4/2008 | Morten |
| 7,376,831 B2 | 5/2008 | Kollmyer et al. |
| 7,380,117 B2 | 5/2008 | Baker |
| 2002/0146125 A1 | 10/2002 | Eskicioglu et al. |
| 2003/0229681 A1 | 12/2003 | Levitan |
| 2006/0212400 A1 | 9/2006 | Kamperman et al. |
| 2006/0224509 A1 | 10/2006 | Walker et al. |
| 2006/0224510 A1 | 10/2006 | Walker et al. |
| 2006/0235793 A1 | 10/2006 | Walker et al. |
| 2007/0022453 A1 | 1/2007 | Cha |
| 2007/0067820 A1 | 3/2007 | Cha |
| 2007/0101358 A1 | 5/2007 | Ambady |
| 2007/0136818 A1* | 6/2007 | Blumberg et al. ............... 726/27 |
| 2007/0217436 A1 | 9/2007 | Markley et al. |
| 2008/0031326 A1 | 2/2008 | Lecomte |

OTHER PUBLICATIONS

ETSI ETR 289: Digital Video Broadcasting (DVB); "Support for use of scrambling and Conditional Access (CA) within digital broadcasting systems," (abstract), published Jan. 1, 1996.
ETSI TR 101 891: Digital Video Broadcasting; Professional Interfaces: Guidelines for implementation and usage of the DVB Asynchronous Serial Interface (ASI) (abstract), printed Nov. 9, 2009.
ETSI TR 102 035: "Digital Video Broadcasting; Implementation Guidelines of the DVB Simulcrypt standard," (abstract), published Apr. 1, 2002.
ETSI TS 101 197 (V1.2.1): "Digital Video Broadcasting; Head-end architecture and synchronization," (abstract), published Feb. 1, 2002.
ETSI TS 103 197 (V1.2.1): "Digital Video Broadcasting; Head-end implementation of DVB Simulcrypt," (abstract), published Sep. 1, 2004.
FIPS 140-2; Security Requirements for Cryptographic Modules, May 24, 2001.
FIPS 180-2; Secure Hash Standard (SHA-1; SHA-256), Aug. 1, 2002, 83 pgs.
FIPS 198; The Keyed-Hash Message Authentication Code, Mar. 6, 2002, 20 pgs.
RFC 1750; Randomness Recommendations for Security, Dec. 1994, 29 pgs.
RFC 2119 Key Words, Mar. 1997, 3 pgs.
RFC 2440; OpenPGP Message Format, Nov. 1998, 61 pgs.
OpenCable (TM) Specification; Common Download 2.0; OC-SP-CDL2.0-I05-071113, Cable Television Laboratories, Inc.; Nov. 13, 2007.
PKCS #1 V2.1 RSA Cryptography Standard, RSA Laboratories; Jun. 14, 2002; 61 pgs.
IETF RFC-3268, Advanced Encryption Standard (AES) Cipher Suites for Transport Layer Security (TLS), Jun. 2002.
FCC 03-225; Implementation of Section 304 of the Telecommunications Act of 1996, Commercial Availability of Navigation Devices and Compatibility Between Cable Systems and Consumer Electronics Equipment; Oct. 9, 2003; 86 pgs.
FIPS SP 800-38A; Recommendation for Block Cipher Modes of Operation—Methods and Techniques; Dec. 2001; 66 pgs.
IETF RFC-2818; HTTP Over TLS; May 2000.
RFC 1991; PGP Message Exchange Formats; Aug. 1996.
SCTE-18; Emergency Alert Messaging for Cable; Society of Cable Telecommunications Engineers; 2007; 31 pgs.
IETF RFC-4254; The Secure Shell (SHH) Connection Protocol; Jan. 2006.
IETF RFC-4250; The Secure Shell Protocol Assigned Numbers; Jan. 2006.
IETF RFC-2246; TLS Protocol—Version 1.0; Jan. 1999.
Shannon, C.E.; "A Mathematical Theory of Communication," Bell System Technical Journal; vol. 27, pp. 379-423 and 623-656; Jul. and Oct. 1948; 55 pgs.
Key Papers in the Development of Information Theory; D. Slepian, Editor; New York: IEEE Press, 1974.
Sloane, N.J.A. and Wyner, A.D., editors; Claude Elwood Shannon: Collected Papers, New York: IEEE Press, 1993.
W. Weaver and C. E. Shannon, The Mathematical Theory of Communication, Urbana, Illinois: University of Illinois Press, 1949, republished in paperback 1963.
International Application No. PCT/US2009/035027; International Search Report mailed Jul. 1, 2009.
International Application No. PCT/US2009/035027; Written Opinion of the International Searching Authority mailed Jul. 1, 2009.
Parallel European Patent Application No. 09840905.5, Supplementary European Search Report dated Aug. 21, 2012.
Liu, B. et al., A Scalable Key Distribution Scheme for Conditional Access System in Digital Pay TV System, IEEE Transactions on Consumer Electronics, vol. 50, No. 2, May 2004.

* cited by examiner

| Acronym | Name | Status |
|---|---|---|
| Secure Micro (SM) Keys | | |
| MRK | SM Assigned Key | Random Key for Encryption |
| MDK | SM Derived Key | Used one-way |
| MxK | SM Ephemeral Key | Used temporarily |
| | | |
| System On a Chip (SOC) Keys | | |
| SRK | SOC Assigned Key | Random Key Encryption |
| SDK | SOC Derived Key | Used one-way |
| SxK | SOC Ephemeral Key | Used temporarily |
| | | |

FIG. 2

| ID Name | MID (Micro ID) |
|---|---|
| ID Length / Type | 40 bits / bslbf |
| ID Life | Life of the SM |
| Creator | Sequential counter maintained by the BBT Key Generator |
| User | SM for unique ID |
| Delivery / Integrity | The MID is delivered, personalized, and validated by the SM manufacturer |
| Storage /Integrity | OTP / Authenticated by the SM secure boot* - |
| Usage | ID for the SM |
| Frequency of Use | Use for all individual messages to the SM |
| Certification | Not applicable |
| Revocation | Not applicable |
| Replacement | SM renewal or replacement |

FIG. 5A

| ID Name | SID (SOC ID) |
|---|---|
| ID Length / Type | 40 bits*[1] / bslbf |
| ID Life | Life of the SOC |
| Creator | Sequential counter maintained by the BBT Key Generator |
| User | SOC for unique ID |
| Delivery / Integrity | The SID is delivered, personalized, and validated by the SM manufacturer |
| Storage /Integrity | OTP / Authenticated by the SOC secure boot*[2] |
| Usage | ID for the SOC |
| Frequency of Use | Use for all individual messages to the SOC |
| Certification | Not applicable |
| Revocation | Not applicable |
| Replacement | Replacement of the SOC therefore replacement of the HOST |

FIG. 5B

| Key Name | MDK (Micro Derived Key) |
|---|---|
| Key Type / Length | Derived AES Symmetric / 128 bits |
| Key Life | Life of the SM |
| Creator | Created by the BBT Key Generator |
| User | SM for one-way system operation |
| Delivery / Integrity | The MDK is securely delivered, personalized, and validated by the SM manufacturer |
| Storage /Integrity | OTP / Authenticated by the SM secure boot* - |
| Usage | Encrypts messages between the Cable Headend and the SM |
| Frequency of Use | Use for one-way system sign-on |
| Certification | Not applicable |
| Revocation | Not applicable |
| Replacement | SM renewal or replacement |

FIG. 5C

| Key Name | SDK (SOC Derived Key) |
|---|---|
| Key Type / Length | Derived AES Symmetric / 128 bits |
| Key Life | Life of the SOC therefore the life of the Host |
| Creator | Created by the BBT Key Generator |
| User | SOC for one-way system operation |
| Delivery / Integrity | The SDK is securely delivered, personalized, and validated by the SOC manufacturer |
| Storage /Integrity | OTP / Authenticated by the SM secure boot* - |
| Usage | Encrypts messages between the Cable Headend and the SOC |
| Frequency of Use | Use for one-way system startup |
| Certification | Not applicable |
| Revocation | Not applicable |
| Replacement | Not applicable |

FIG. 5D

| | |
|---|---|
| Key Name | MRK (Micro Random Key) |
| Key Type / Length | AES Symmetric / 128 bits |
| Key Life | Life of the SM |
| Creator | Created by the BBT Key Generator |
| User | SM for alternative or system recovery operation*[1] |
| Delivery / Integrity | The MRK is securely delivered, personalized, and validated by the SM manufacturer |
| Storage /Integrity | OTP / Authenticated by the SM secure boot* - |
| Usage | Undefined |
| Frequency of Use | Undefined |
| Certification | Not applicable |
| Revocation | Not applicable |
| Replacement | SM renewal or replacement |

FIG. 5E

| | |
|---|---|
| Key Name | SRK (SOC Random Key) |
| Key Type / Length | AES Symmetric / 128 bits |
| Key Life | Life of the SOC therefore the life of the Host |
| Creator | Created by the BBT Key Generator |
| User | SOC for alternative or system recovery operation |
| Delivery / Integrity | The SRK is securely delivered, personalized, and validated by the SOC manufacturer |
| Storage /Integrity | OTP / Authenticated by the SM secure boot* - |
| Usage | Undefined |
| Frequency of Use | Undefined |
| Certification | Not applicable |
| Revocation | Not applicable |
| Replacement | Not applicable |

FIG. 5F

CABLE TELEVISION SECURE COMMUNICATION SYSTEM FOR ONE WAY RESTRICTED

This application is the United States National Stage of International Application Number PCT/US2009/035027, filed Feb. 24, 2009, hereby incorporated by reference.

TECHNICAL FIELD

This invention relates initially to cable television systems that provide secure, subscriber access to a cable signal. More specifically, it involves cable systems that provide set top receivers which require a cryptographic unlock key or keys where the key or keys can be held as a complete unknown without even involvement of a centralized trusted authority for such cryptographic keys. The invention is particularly suited to use with broadcast providers who do not want any information available to a competitor or other third person in order to securely prevent risk of cryptographic attack or unauthorized hacking into the broadcast signal.

BACKGROUND

Cable-television systems are one of a myriad of electronic applications where subscriber access is desired. Typically, the subscriber access is provided through use of encrypted signals and some type of decoder. For cable-television systems it is not uncommon to have a receiver and a decoder as a set-top box from which a television or other device may display the information received. One of the ways in which such systems may operate is for the set-top box to have embedded within it a decryption code or key. This decryption code is then used by the broadcast facility to deliver the keys necessary to provide individualized access allowing the set-top box to decrypt a video service. The decryption code may be a cryptographic key and is frequently provided to the set-top box at time of manufacture. A separate third person is often used to understand and have access to all of the codes for the manufactured boxes. This third person is trusted to maintain the secrecy of the various codes and is referred to as a trusted authority. After manufacture and providing the codes to the trusted authority, a broadcast facility who has purchased or otherwise provided the set-top box obtains that specific box's decryption code by utilization of the trusted authority. Unfortunately, perfect trust is never possible. There is also uneasiness as to the origination of the knowledge with respect to these decryption or cryptographic keys. Generally, there is a desire not to provide any possibility of access to one's competitors or to unknown persons such as overseas manufacturing capabilities or the like. This is compounded by the fact that it is not practical for each broadcast provider to have their own manufacturing facility for their own set-top boxes. Thus it has been a long felt desire to somehow eliminate the need for and use of a trusted authority while yet maintaining use of specific individualized encryption codes for particular devices.

These desires exist because in spite of the often extreme precautions taken to protect decryption keys, the cable industry has more than 25 years of experience with attacks on its security systems. Compromised authorization remains an important consideration, and attacks such as cloning, musketeering, replaying messages, substituting message language, insider compromises, and vulnerability of trusted hardware still remain to name but a few. For some time, there has existed a goal of being able to provide a true one-way system that can securely provide broadcast signals on a subscriber basis without any trusted authority or other risk relative to a potential compromise of the decryption keys used.

SUMMARY DISCLOSURE OF INVENTION

The present invention provides technology and methods and apparatus that can achieve a secure cable television or other electronic device access that maintains the full security of a traditional decryption key process while completely eliminating any need for a trusted authority. It has been understood that any system that uses a decryption key must at some time provide knowledge of that key to the broadcast user. For example, when the broadcast facility is ready to open access to its signal for that subscriber, it has been known that the broadcast facility has to access or know that subscriber's decryption key to open the access. What is surprising is that the present invention provides a system that shows that these two accepted beliefs are not, in fact, requirements. From some perspectives, it is even surprising that a system such as the present invention—where no trusted authority is involved—can exist while providing subscriber access protected by the very secure paradigm of a decryption key or cryptographic key environment. Through various embodiments, the present invention shows that various processes and hardware devices can be provided to achieve the security of a robust encryption key while totally avoiding any need for a trusted authority. The methods and apparatus for restricted access to an electronic signal described address many overall goals in a practical manner. Naturally, further objects of the inventive technology are apparent from the description and drawings below.

BRIEF DESCRIPTION OF THE DRAWINGS

FIG. 2 is a table of some of the cryptographic key designations that may be used in understanding embodiments of the present invention.

FIG. 5 A-F provide illustrative, non-limiting, examples of some possible criteria that may be applied to the various keys or other information for some embodiments.

MODES FOR CARRYING OUT THE INVENTION

As mentioned earlier, the present invention includes a variety of aspects, which may be combined in different ways. The following descriptions are provided to list elements and to describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed processes or elements, with each process or element alone, and also with any and all various permutations and combinations of all processes or elements as may be presented in this or any subsequent application.

Figure 1:
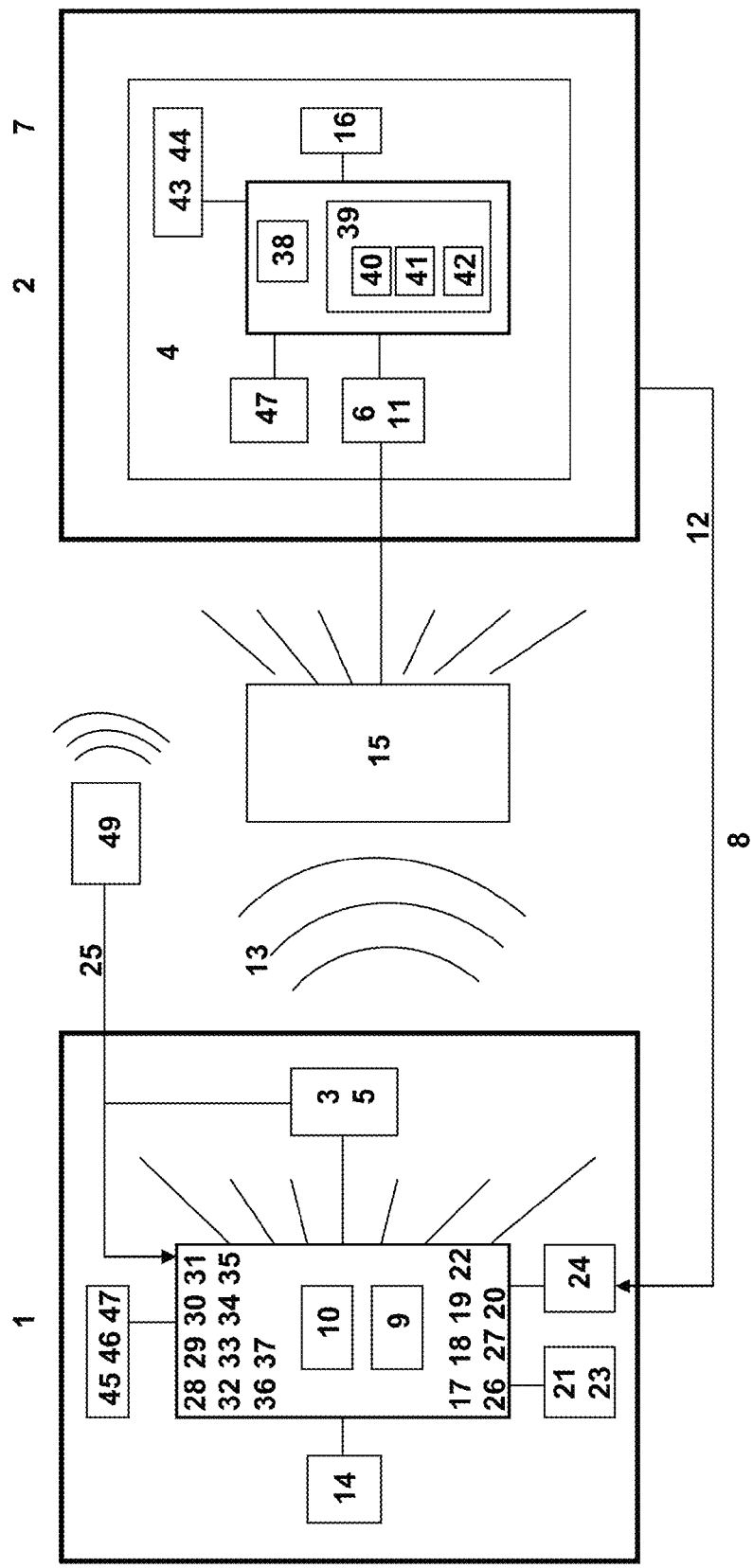
FIG. 1 is a schematic diagram of a cable television type of system according to one embodiment.

FIG. 1 presents a schematic diagram of an embodiment of the invention. It provides a context to step through various hardware elements involved, and to understand how systems according to the present invention can provide a method of providing restricted access to an electronic signal and a system for restricted access to an electronic signal. At a basic level, the invention can be understood as establishing a broadcast transmission capability (1) that provides an encrypted signal to an individual reception capability (2). The capability may be considered as existing at a facility and both the capability and the facility may be dispersed at a variety of locations, buildings, or even countries. The encrypted signal may be provided or transmitted by wires, fibers, or by radio wave such as shown emanating from the broadcast transmitter (3) to some localized cable provider element (15). In traditional cable television systems, the radio waves may be converted and provided the through cabling, fibers, wires, or in air to an individual subscriber receiver (6)—or more likely to a collection of many individual subscriber receivers (6).

In general, the broadcast transmission capability (1) may be an entire facility or a composite of facilities at many locations. These may be configured to generate an encrypted signal for subscribers who may each have established for them an individual reception capability (2). A broadcast transmission capability (1) may be configured to generate the encrypted signal and to provide individualized access to the signal. Once subscriber payment, sign up, or the like has been accomplished, the broadcast transmission capability (1) may activate decryption processing of the encrypted signal at the individual reception capability (2). This may be accomplished by actually reconfiguring the individual reception capability (2). A subscriber decryption processor (4) may be reconfigured or initially configured to physically unlock access to the encrypted signal at the individual reception capability (2). The act of physically unlocking a device with a key can be considered the equivalent to a key unlocking to door to allow it to be opened, but, of course, as it is access or operability that is being unlocked, it can occur by, through, or even within hardware, firmware, or software.

As can be seen from the figures and an understanding of the invention, embodiments can use traditional cable componentry, with particular software or computer hardware configurations. For example, a broadcast transmitter (3) can transmit a signal to one or more cable informational service signal origination point facilities (5), sometimes referred to in a cable context as head ends. These facilities can each provide an identifiable source for the subscriber signal. Once transmitted, perhaps across the cable network or wires, the encrypted cable informational service signal (13) can be received by a conditional access television device receiver (11) that may be established for a subscriber. The conditional access television device receiver (11) can be a capability within a set-top box (7) that is part of the individual reception capability (2). An aspect of the invention that makes implementation easier is the fact that embodiments can provide a cable informational service system hardware individualized information transmission (8). As can be seen in FIG. 1, the cable informational service system hardware individualized information transmission (8) can be separately provided through some sort of transmission medium. For example, as discussed later this may be simply information transmitted via a telephone line from the individual subscriber to the broadcast provider. As discussed later it may be understood that this individualized information transmission (8) may be completely unsecure and yet may not jeopardize or even substantially increase the risk of a compromise of the cryptographic key for that individual reception capability (2).

In understanding the generality of the present invention, it should be understood that although presented initially as a cable television system, it may be applied to other systems as well. The systems may involve some sort of an encrypted information transmission ranging from free-to-air systems, direct to home satellite systems, direct broadcast satellite systems, DSL, internet providers, internet based systems, fiber to home systems, and even systems to activate devices. Receivers may be simply electronic devices (2) that are unlocked with individuality. Thus, it can be understood that in certain applications instead of establishing a broadcast transmission capability (1), a system may be implemented in environments which establish an electronic device enabling facility (1). This electronic device enabling facility (1) may communicate with a conditionally operable electronic device (2) configured to receive a service enablement signal (13) that can act to physically unlock at least some capability for a conditionally operable electronic device (2).

As mentioned earlier, a perhaps surprising aspect of the invention is the fact that it can utilize cryptographic keys that are completely unknown, that is, a completely unknown decryption key. In this regard, it should be understood that the keys involved are not only unknown, they are not known to a trusted authority; they are not known to the broadcast transmission capability (1), and they are not known to the individual reception capability (2). Even perhaps more astounding is the fact that not only are the keys not known to these persons; they are even not known to any person in the entire world—and yet they are completely operable. Thus, although the individual reception capability (2) can react to a proper key, it does in fact not "know" that key and it cannot be somehow pulled out of it. Similarly, although the broadcast transmission capability (1) can utilize information and ultimately encrypt based on the individual reception capability's (2) key, it also does not know that key. This is important because it means no likely tampering or device access can provide the specific key information. In fact, embodiments of the invention act for the first time and thus nascently, to nascently generate the completely unknown decryption key by capabilities pursuant to embodiments of the present invention. This means that embodiments can accomplish assuring that the completely unknown decryption key is ubiquitously secreted from all persons. Embodiments have hardware designed to provide a nascent decryption key generator (10), that is, a decryption key generator that for the first time creates a key previously determined to be appropriate to a specific individual reception capability (2). As discussed later, embodiments can achieve this by responding to the unsecure individualized information transmission (12) provided from the individual reception capability (2). They can even derive the completely unknown decryption key at least partially from the unsecure individualized information transmission (12). In order to provide this unsecure individualized information transmission, the individual reception capability (2) may even include an unsecure individualized information generator (16) that may be as simple as a display that indicates an easily knowable identification code (perhaps a serial number) that can then be communicated to some facet within the broadcast transmission capability (1).

The aspect of having a completely unknown decryption key is significant because it allows an elimination of the trusted authority. Nobody knows the key. Thus, embodiments of the invention can act to assure that the completely unknown decryption key is initially unknowable at the broadcast transmission capability. They can act to eliminate any use of a cryptographic trusted authority for the completely unknown decryption key or keys.

Similarly, embodiments can act to assure that the completely unknown decryption key is also initially unknowable at said individual reception capability (2). The individual reception capability (2) or the set-top box (7) cannot be practically manipulated to yield knowledge on the individual keys. Further, the individual reception capability (2) can be prevented from any knowledge as to how the completely unknown decryption key is even derived at the broadcast transmission capability (2). While the individual reception capability (2) can react to an appropriately decrypted signal, there may also be included specific tamper proofing of chips and memories with the individual reception capability (2). Systems can be set up to accomplish destructively tamper proofing computer chip information within the individual reception capability (2) so that if any inappropriate activity occurs, the chip itself ends up destroying any potentially compromising information.

In a general sense, an aspect of the invention is the fact that once the unsecure individualized information transmission (12) is received, the broadcast transmission capability (1) can act to add cryptographic entropy and take that completely unsecure information and utilize it to generate fully secure information. As those in cryptography well understand, adding cryptographic entropy means that the information involved is expanded so that any attempts at decryption become increasingly more difficult. From this perspective, the broadcast transmission capability (1) can include a cryptographic decryption key entropy addition generator (17) that can add cryptographic entropy for the decryption key or otherwise. Cryptography can often be represented as accomplishing a mathematical function in some specific way. Such cryptographic functions can range from simple functions (e.g., adding one to a value) to more complex functions (e.g. accomplishing an Advanced Encryption Standard (AES) established encryption function for a 2048-bit asymmetric key). In this sense, the nascent decryption key generator (10) can generate a cryptographic key by mathematically functioning one or more items of information. As can be appreciated from the above, at least one item of information, namely, the unsecure individualized information can be used to generate a cryptographic key. In other embodiments, at least two items of information can be used. Thus, designs can manipulate first item(s) through some cryptographic function and may manipulate second item(s) to perhaps the same or some other cryptographic function. As one example, designs can accomplish manipulating items to support creation of a cryptographic key by manipulating first items through a cryptographic function, perhaps such as a reversible cryptographic function and can then accomplish manipulating second items through a cryptographic function, again perhaps such as the same or a different reversible cryptographic function all as part of supporting the creation of a cryptographic key. These functions can be achieved by a first cryptographic function processor (perhaps such as a first reversible cryptographic function key generator or even a first cryptographic encryption function key generator) and a second cryoptographic function processor (perhaps such as a second reversible cryptographic function key generator or even a second cryptographic encryption function key generator).

Embodiments can involve an at least dual information input mathematically functional cryptographic key generator (18). In such a system, one item of information can even be utilized as a mathematical operand to perform a transformative function on another item of information. Embodiments can include a first informational input mathematical operand processor (19) and a second informational input transformative function processor (20). Needless to say any functions considered to perform a cryptographic action can be used. For example, in a preferred embodiment, hardware can add cryptographic entropy by accomplishing a step of utilizing some item of provider information. Thus, hardware or more likely software designs can include a provider information input (23) to which the nascent decryption key generator (10) may be responsive. When two inputs are used, the system can be considered as having an at least two dimensional cipher key derivation processor (22), and as utilizing an at least two dimensional cipher key derivation functionality. These two dimensions can involve utilizing at least some reception facility information and utilizing at least some broadcast facility information. In this manner, the at least two inputs can be considered as a reception facility information input (24) and a broadcast facility information input (21). As but one example, the reception facility information input (24) can provide an unsecure item or items of information, such as a serial number or the like. Further, the broadcast facility information input (21) can provide a secure item or items of input. Each of these can be cryptographically functioned to add entropy to an item and perhaps achieve the desired cryptographic key.

Figure 4:
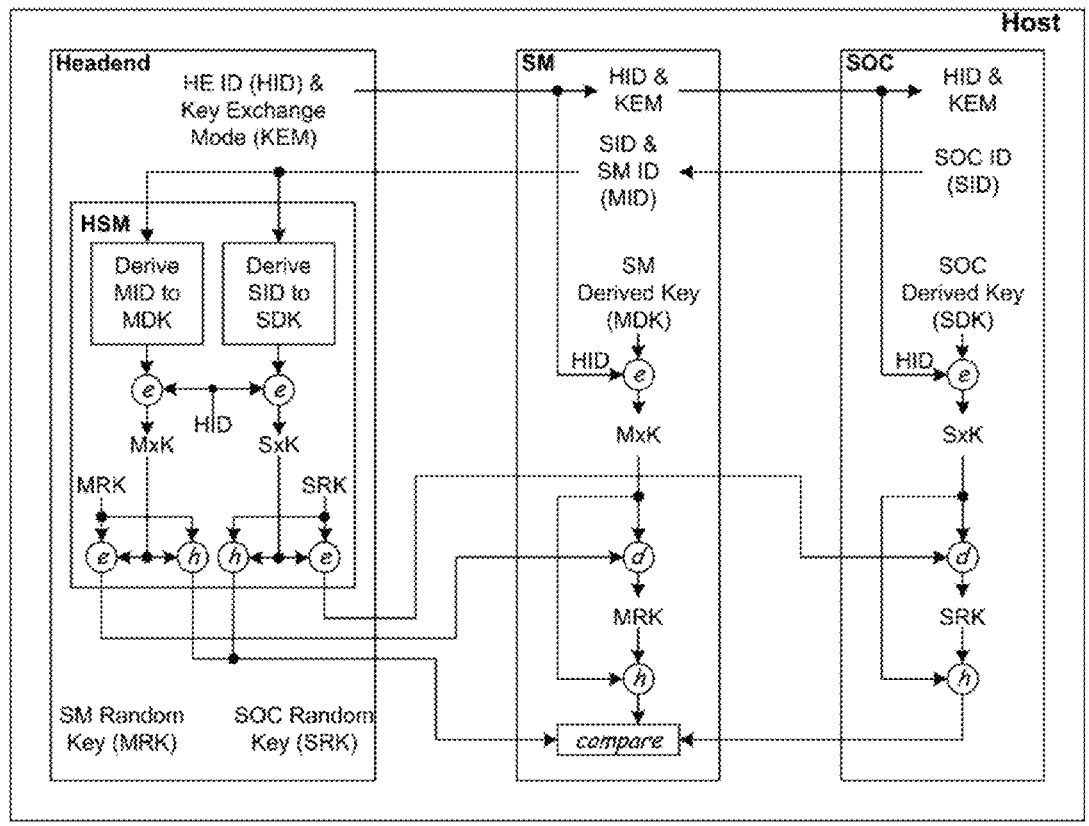
FIG. 4 shows operabilities as they may exist within a broadcast facility to achieve use of the completely unknown cryptographic key.

As can be understood from the sequence of key generation activities shown in FIG. 4, it can be understood that the initial unsecure individualized information can yield a derived key, then the derived key can yield a key that is temporarily used such as an ephemeral key, then the ephemeral key can be used to issue a new random key. Once the derived key is generated, in embodiments, further processing can occur. For example, embodiments can further establish a cryptographic key using the derived cryptographic key with yet other (perhaps even unsecure) provider information to yield an ephemeral key. For example, the derived key (perhaps achieved by using the unsecure individualized information transmission (12)) may be used with information perhaps such as signal origination point identification information with both as inputs to an encryption hash function or a cryptographic encryption function to generate an ephemeral key. There may be a signal origination point identification information input (25) and at least one derived key input (26) to an encryption hash function processor (27) or a cryptographic encryption function processor (27) to generate the ephemeral key. As discussed, it should be understood that whether embodied in hardware, firmware, or as software, the term "input" may be an actual input or it may be an internal signal or even a transient signal value that is used to achieve the end result; there need not be a formal input signal.

As may be appreciated from the above, embodiments may accomplish multi-step mathematically manipulating items to support creation of a cryptographic key. Thus, embodiments may be considered to include a multi-step mathematically functional cryptographic key generator (28). As a person of ordinary skill in cryptography would well understand, a great variety of cryptographic functions can be utilized in the key generator (28) to manipulate an input or otherwise generate the required key based communication. Embodiments can act to achieve manipulating items through a reversible cryptographic function to support creation of a cryptographic key, manipulating items through a one-way cryptographic function to support creation of a cryptographic key, manipulating items through an encryption function to support creation of a cryptographic key, cryptographically encrypting items to support creation of a cryptographic key, cryptographically hashing items to support creation of a cryptographic key, manipulating items through a cryptographic hash function to support creation of a cryptographic key, utilizing a random value generator cryptographic function to support creation of a cryptographic key, and manipulating items through a data stream location pointer function to support creation of a cryptographic key, to name a few of the many options possible. Similarly, hardware or computer memory or programming configurations can include a reversible cryptographic function key generator (29), a one-way cryptographic function key generator (30), a cryptographic encryption function key generator (31), a cryptographic hash function key generator (32), a random cryptographic key generator (33), or a data stream location pointer function key generator (34) among other options. The reversible cryptographic function can be a cryptographic encryption function, and similarly, the one-way cryptographic function can be a cryptographic hash function and their similar generators. Of course other cryptographic functions can be used including but not limited to: symmetric key processes, asymmetric key processes, AES encryption processes, secure hash functions, hash message authentication processes, and the like. All of this may be accomplished in a hardware security module that can generate and store keys and this may be itself held secure or even tamperproof.

To clarify the options available for embodiments, it should be understood that sequences and selections of functions can occur as part of the system or to add entropy or the like. One function can occur before another function, and even the order and selection of the various functions can be varied. For example, after creating an initial cryptographic key, embodiments can subsequently utilize a random value generator cryptographic function to support creation of a ultimate cryptographic key, and thus can include the random cryptographic key generator (33). Even portions of data can be selected for use and embodiments can achieve manipulating items through a data stream location pointer function to support creation of a cryptographic key and can include the data stream location pointer function key generator (34).

In varying the inputs that can be utilized, it can be understood that embodiments can achieve operating an encryption function utilizing or somehow affected by the unsecure individualized information together with perhaps some type of provider information. There can even be more than one of each type of information which can be provided or acted upon at different times and even at differing locations so that the capability can be directly or indirectly affected by the information somehow and thus considered as operating with the information. For example, and as discussed below, an encryption operation function processor (35) can achieve cryptographically hashing or cryptographically encrypting at least one derived cryptographic key together with some type of signal origination point identification information and can thus serve as an encryption hash function processor or as a cryptographic encryption function processor. Configurations can also support establishing at least one ephemeral cryptographic key and the inclusion of at least one ephemeral cryptographic key generator (36). This ephemeral cryptographic key can be used to transmit the ultimate cryptographic key for operable use as discussed below.

As part of a multi-step procedure, embodiments can include secondary functions as well. These secondary functions, can act after an initial function to further change or develop some type of cryptographic key for ultimate use. For example, in addition to utilizing some initial aspect of provider information, embodiments that transmit an encrypted signal from a signal origination point transmitter can utilize signal origination point identification information as part of the process to establish at least one derived cryptographic key. They can then secondarily cryptographically operate on that at least one derived cryptographic key and can even utilize signal origination point identification information as at least part of discerning or generating the completely unknown decryption key for use. From this, it can be understood that systems can include a secondary provider information cryptographic transformation processor (37), or a capability that achieves a second or additional cryptographic transformation on some item.

The keys themselves can of course have varying characters. For instance, embodiments can achieve generating at least a 128-bit decryption key at least partially from said unsecure individualized information and can include an at least 128-bit decryption key generator. Various criteria for certain of the types of keys or other information used in some preferred embodiments are set out in the tables in FIG. 5 A-F. As may be appreciated, these criteria may be varied or even nonexistent in any embodiment.

As mentioned above, a variety of provider information can be utilized. In one embodiment, the broadcast transmission capability (1) may be manipulatively responsive to the unsecure individualized information transmission perhaps together with some type of provider information. It can negotiate a sign on and eventually communicate using an appropriate decryption key or keys. As one type of provider information possible, the cable signal origination point may constantly broadcast a signal origination point identification onto a cable network for the host or individual reception capability (2). This may be received upon first attachment or connection to the cable network and perhaps upon every power up. For example, on every power-up, individual reception capability (2) may receive the broadcasted signal origination point identification message. If the host receives a signal origination point identification that is the same as that stored, then the host device may continue to operate with no change (and may even continue to use the existing, previously downloaded conditional access system). If the host receives a signal origination point identification that is different than the previously stored signal origination point identification from the last cable network connection, then the host or individual reception capability (2) may proceed with a standard first-time or renewed sign-on process. To accomplish this, the individual reception capability (2) may generate an on-screen message instructing the customer to call their cable provider. This message may also display an alpha numeric or other code to be read or otherwise provided to the cable provider. This code may contain unsecure identification(s) in an alphanumeric, perhaps even modulo 32 format. Upon calling the cable provider, the customer may be requested to read the code and it can be entered at the broadcast transmission capability (1). With this, the cable signal origination point code may also be used together with a secure system wide cryptographic key and the broadcasted signal origination point identification to generate a derived key and ultimately one or more ephemeral keys. This or these ephemeral keys can be used to transmit or download a security element such as a random key for enduring use. The ephemeral key or keys may be unique only to a specific signal origination point, and may be only used once to encrypt and deliver or download a random key.

As can be understood, by using secure system wide cryptographic keys, and perhaps an unsecure signal origination point identification, provider commonality information can be integrated into the key generation process and into a cryptographic operation. Thus, embodiments can be considered as having a cryptographic provider commonality information integrator (48) responsive to provider commonality information and also to cryptographic unsecure individualized information. The unsecure individualized information and secure provider commonality information cryptographic integrator may be a routine within the nascent decryption key generator (10). As may be appreciated, by using signal origination point identification information as one example, the system may achieve integrating the unsecure individualized information and specific transmitter commonality information into the cryptographic operation.

In the above example, two types of provider information are included in the example: signal origination point identification information, possibly a head end ID, and a secure system wide cryptographic key, possibly considered a root key. In the example shown, the head end identification information can be unsecure, available information. This may be constantly transmitted, such as on a side band or other communication. As one of ordinary skill in the art would understand, the head end transmission may include an authentication function. Unlike the unsecure signal origination point identification information, embodiments can utilize a root key that may be a secure key for system wide cryptography. This key may even be used in the manufacture of the set-top box (7), the manufacture of the set-top box chips, or by the broadcast provider to establish a derived code that may be used by the set-top box (7). One of the inputs that can be used in some type of cryptographic function can be the secure system wide cryptographic key or more precisely a secure system wide cryptographic key input as one of the provider information inputs (23). Embodiments can achieve establishing a cryptographic key using the unsecure individualized information as one of the reception facility inputs (24) and by using the secure system wide key input as two inputs to a cryptographic encryption function. Thus, the cryptographic encryption processor can be responsive to the unsecure individualized information input and the secure system wide key input.

As discussed in the more specific example shown, processors can establish and comprise at least one derived cryptographic key. This derived cryptographic key can be used to further generate an ephemeral cryptographic key. The ephemeral cryptographic key can then be used for securely communicating an item which may even be a random cryptographic key perhaps for enduring use. The signal origination point information transmitter (49) that may be associated with the cable informational service signal origination point facility (5) may provide information with which the at least one ephemeral cryptographic key or generator is responsive. Similarly, systems can have a generator that establishes at least one ephemeral cryptographic key to perhaps be used to securely transmit or download at least one random decryption key that is created by at least one random decryption or cryptographic key generator (33).

By securely sending at least one random decryption key encrypted by at least one ephemeral cryptographic key, embodiments can transiently use a key and thus leave it less vulnerable to attack. A secure random decryption key transmitter (perhaps such as the broadcast transmitter (3), may be cryptographically responsive to at least one ephemeral cryptographic key and at least one random decryption key generator, it can even be configured to immediately send at least one random decryption key encrypted by at least one ephemeral cryptographic key so there is only a one-time use of the ephemeral key. This can be an example of having a transient ephemeral cryptographic key based secure random decryption key transmitter and activating decryption processing based upon at least one random decryption key. Once transmitted, the random decryption key can thereafter be continually and enduringly (at least until a potential compromise event occurs as discussed below) used in regular operation. Thus, embodiments can have an enduring operation random decryption key based decryption processor as part of the security processor (38) or the signal processor (39) discussed below.

As mentioned above, there may be multiple inputs such as multiple unsecure individualized items of information in one or more transmissions. This can coordinate well with existing chip structures for set-top boxes (7). In cable television systems, it is not uncommon for the set-top box (7) to include two separate capabilities as one or even separate chips: a security processor (38) and a signal processor (39). In some applications, these may be what are known or referred to as a secure microprocessor (SM) or secure micro and a system on a chip (SOC). A security processor (38) can be a chip or software functionality within a chip that serves to handle the security functions, and basically opens access to encrypted signals. It may handle the aspect of providing decryption access functions so that the entire signal can be processed and presented on a television or the like. The security processor (38), can of course have its own identification codes and thus there can be provided an individualized security process capability identification information transmission perhaps as part of the unsecure individualized information transmission (12). Within the set-top box (7) there may also be a signal processor (39) that can provide signal process capabilities. It, too, may have individualized identification capabilities, and so the individual reception capability (2) may be capable of providing an individualized signal process capability identification information transmission, also perhaps as part of the unsecure individualized information transmission (12). With the understandings discussed above, it can be understood that each of these unique items of identification information can be used in the embodiments of the present invention. As discussed above, once it is understood that random cryptographic keys can be generated, it can be understood that the broadcast transmission capability (1), may generate both a security process capability random cryptographic key and a signal process capability random cryptographic key. These keys may then be used for enduring operation, and so embodiments may have an enduring operation security process capability random cryptographic key based decryption processor and an enduring operation signal process capability random cryptographic key based decryption processor.

Even within the signal process capability there may be a division of functionalities, software, or even chip structure. There may be a security partitioned signal transport capability (40) perhaps such as assigned to transport the signal internal to the set-top box (7). This may have partitioned or somehow set apart functionally or physically within it a separate security aspect—even if less than the more protective security process capability. Similarly, the signal processor (39), may include a video signal process capability (41) and a audio signal process capability (42). These may process video and audio separately so that the ultimate signal may be provided to the television or other output device.

With this understanding, it can be appreciated how additional inputs can be used to aid in generation of the ultimate cryptographic key to be utilized. Each of these identification and processing capabilities can present an opportunity for cryptographic function input. Options may include: an individualized security process capability identification information input, an individualized signal process capability identification information input, and both an individualized security process capability identification information input and an individualized signal process capability identification information input. This, when combined with the various options for provider input such as: a secure system wide cryptographic key information input, a signal origination point identification information input, and both a secure system wide cryptographic key information input and a signal origination point identification information input can expand the various hardware, software, and even process step embodiments possible. Systems may achieve utilizing individualized security process capability identification information, utilizing individualized signal process capability identification information, utilizing both individualized security process capability identification information and individualized signal process capability identification information, utilizing secure system wide cryptographic key information, utilizing signal origination point identification information, and utilizing both secure system wide cryptographic key information and signal origination point identification information, to name a few. From this it can be understood how embodiments may utilize multiple unsecure individualized information codes and may include a multiple unsecure individualized information code transmission or transmissions. Designs may provide for utilizing a first item of unsecure individualized information in a cryptographic operation, a first item of unsecure individualized information transmission, providing first process capability individualized identification information, and a first process capability individualized identification information transmission. As explained in the example above, this may be an aspect such as providing individualized security process capability identification information or the like. Similarly, designs may provide for utilizing a second item of unsecure individualized information in a cryptographic operation, providing second process capability individualized identification information, a second process capability individualized identification information transmission, and a second item of unsecure individualized information transmission. One example of this may be a step such as providing individualized signal process capability identification information.

In understanding the example, embodiments can include an unsecure individualized information transmission (12), this transmission may be set up as a simple telephone call to read the broadcast provider certain codes. A seemingly single code could actually be a concantonation of two codes, perhaps such as the individualized security process capability identification information and the individualized signal process capability identification information. In this fashion, embodiments may achieve utilizing multiple unsecure individualized information codes (even if it appears to a subscriber as one) and a multiple unsecure individualized information code transmission. This may result in utilizing a first item of unsecure individualized information in a cryptographic operation, and similarly, a first item of unsecure individualized information transmission, and utilizing a second item of unsecure individualized information in a cryptographic operation, and similarly, a second item of unsecure individualized information transmission. By combining a first process capability individualized identification information and a first process capability individualized identification information transmission with providing second process capability individualized identification information and a second process capability individualized identification information transmission, embodiments can expand security. These may include providing individualized security process capability identification information and an individualized security process capability identification information transmission with providing individualized signal process capability identification information and an individualized signal process capability identification information transmission. Each of these may even be unsecurely transmitted and by unsecurely transmitting both individualized security process capability identification information and individualized signal process capability identification information from the individual reception capability (2), there may be the step of transmitting cryptographic entropy rate of zero identification information and a cryptographic entropy rate of zero identification information transmission. This may even be verbally conveyed to achieve an unsecure verbal individualized information transmission.

To achieve the step of unlocking the signal process capability within the set-top box (7), embodiments may act to provide or make operable a secure bootloader, that is, a device that provides the operational basis to allow operation of the set-top box (7) in the first place. Thus, embodiments may achieve securely delivering a conditional access component such as an unlock code or the like to the individual reception capability (2) and there may be a conditional access component transmitter, perhaps such as the cable informational service signal origination point facility (5), the broadcast transmission capability (1) or the like, to which the individual reception capability (2) may be operationally responsive. Designs can achieve activating a secure bootloader functionality at the individual reception capability (2) and can include a secure bootloader (43). Again, each of these aspects may exist independently or may be combined with the multiple capabilities of the various capabilities.

As should be appreciated, various system architectures can be used. The conceptual system elements shown may result in or effect a key generation and personalization aspect. This may integrate with a network operations center authorizing multiple head ends. There may be an uplink entitlement control message (ECM) generator and an entitlement management message (EMM) generator that inject descrambling information to enable unlocking of one or more subscribers. Authorization of the service content can be handled by a cable head end controller or the like. This can handle download of host code, a cryptographic key, and/or a conditional access system. A subscriber authorization system may be included to facilitate conditional access messages and the like. The host, perhaps a set-top box (7), may contain the secure micro and system on a chip capabilities each with key exchange capabilities. The secure micro may contain a secure bootloader. The system on a chip capability may allow key exchange and may further protect the authorized content perhaps for storage or MPEG or other compression.

Figure 3:
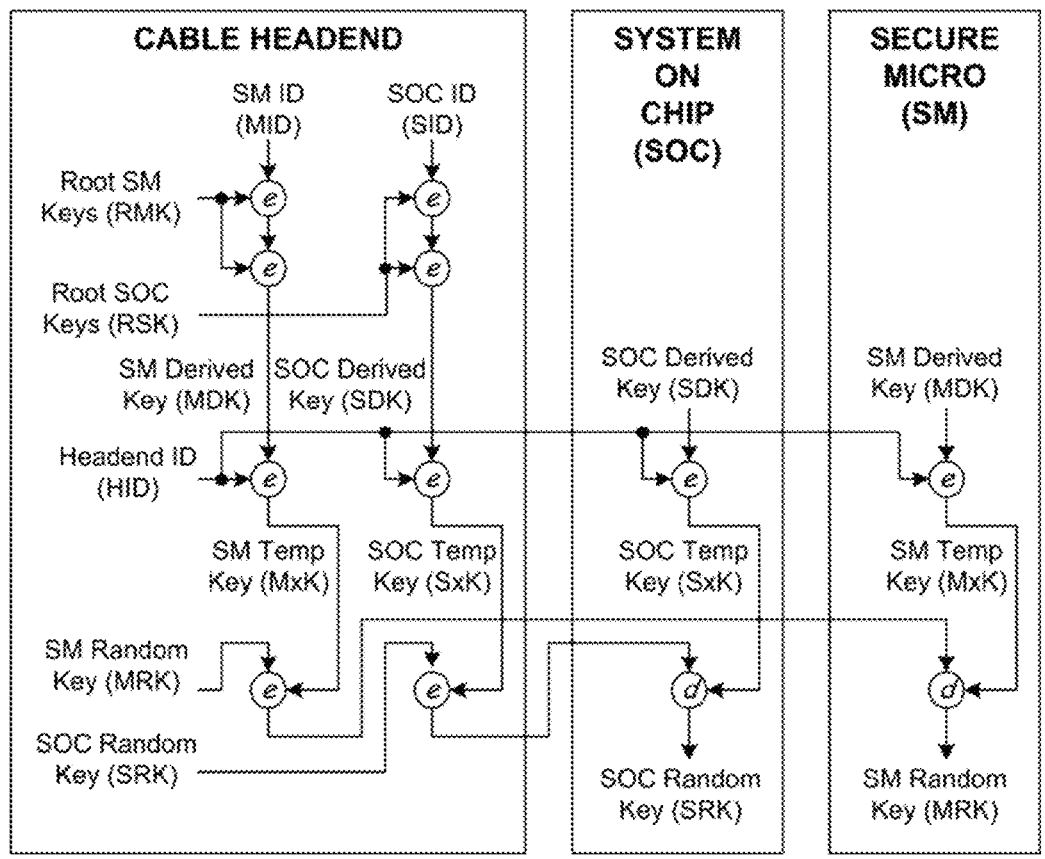
FIG. 3 is conceptual diagram of some key generation processes that may be used in understanding embodiments of the present invention.

Referring to FIG. 3, and can be understood how one or more initial individualized items of information, shown as the two IDs, the MID, that is, the secure micro identification, and the SID, that is, the system-on-a-chip identification can be input with the root key to be acted upon in some cryptographic operation and thus yield a derived key. This (or these) derived key(s) can then be combined in another cryptographic operation with the signal origination point identification to yield an ephemeral key. This ephemeral key can then be used, and is operable within the individual reception capability (2), perhaps for the purpose of transmitting a truly random key or keys. This random key or keys can then be used in an enduring fashion to conduct operations and receive and decrypt the paid-for subscription signal.

FIG. 4 shows similar processes in a different graphic with additional details. It shows how within the hardware security module in the signal origination point or in the broadcast transmission capability (1), an input providing the signal origination point identification and perhaps some type of key exchange mode or even root key can be used to derive both a security process derived key and a signal process derived key. The security process derived key (MDK), and security process derived key (SDK) can be used and further combined with the signal origination point identification information in a hashing (shown) or cryptographic encryption function to yield two ephemeral keys, namely, a security process ephemeral key (MxK) and a signal process ephemeral key (SxK). These two ephemeral keys can be used to transmit two random keys, perhaps the security process random key (MRK) and the signal process random key (SRK). Further, these two transmissions can then be provided to both the secure micro, or security process capability within the individual reception capability (2), and to the SOC, or signal process capability within the individual reception capability (2). Since these two capabilities have a functionality to use both the derived key or keys (previously functionalized but not known or know-able within the individual reception capability) and the signal origination point identification to decrypt, a decryption using the ephemeral key can be achieved and the two random keys can be received for enduring operation.

Thus, in at least one embodiment, transmitting the encrypted signal from a signal origination point transmitter, or a broadcast transmission capability (1), in a manner that utilized provider information such as a signal origination point identification information input, can be one way embodiments can achieve the desired capability with a completely unknown decryption key. By cryptographically operating on the unsecure individualized information and perhaps on provider information as at least part of discerning the completely unknown decryption key, systems can be considered as having an individualized information cryptographic transformation processor and even a provider information cryptographic transformation processor.

As mentioned above, embodiments can provide for multiple options for provider information or for individualized information such as from the individual reception capability. This can not only include secure system wide cryptographic keys, signal origination point identifications, and derived keys, but even multiples for each of these. For instance, with respect to the secure system wide cryptographic keys, or perhaps the root keys, a capability may be included to select one of many possible root keys and to accomplish the step of choosing a particular secure system wide cryptographic key from among a plurality of secure system wide cryptographic keys and operating with a chosen secure system wide cryptographic key.

The broadcast transmission capability (1) can also generate a newly selected new cipher key for use between the individual reception capability (1) and the broadcast facility in a nascent decryption key re-generator. Generally, however, systems can achieve the step of selecting a secure system wide cryptographic key from among a plurality of secure system wide cryptographic keys and can have a secure system wide cryptographic key multiple option selector. As one, non limiting example, this can be achieved by including a segmented secure system wide cryptographic key and having the system select an item of provider information from within the segmented secure item of provider information. As but one way to provide a secure system wide cryptographic key multiple option selector (45), designs can act to point to a segment of the segmented secure system wide cryptographic key, can accomplish pointing to a segment of information, and can include a segmented interdata pointer (46) that can indicate a segment of secure cryptographic code or information to be utilized to accomplish selecting a segment of information as a secure system wide cryptographic key.

Similar techniques can be applied with respect to the individual reception capability cryptographic keys such as the derived keys. A capability may be included to select one of many possible derived keys and to accomplish the step of choosing a particular derived key from among a plurality of derived cryptographic keys and operating with a chosen derived cryptographic key. This capability may similarly operate in a manner that includes a derived cryptographic key. Systems can use a segmented information pointing function for these keys, can accomplish pointing to a segment of information for a derived key, can accomplish choosing a particular derived cryptographic or other key from among a plurality of such keys, or can otherwise achieve either the segmented or other selection operations at any level and in a great variety of manners.

Whether included on the broadcast transmission capability side or on the individual reception capability side, or both, the aspect of having multiple keys or codes available can be beneficial if or when a potential compromise event occurred, perhaps even something as simple as merely moving or even unplugging the set-top box (7). Activities can be conducted to assess if there is an enhanced risk to the cryptographic keys to be enduringly used. They can assess continued operability based upon either of the random cryptographic keys provided and can include a potential key compromise assessor (43). This can be achieved perhaps simply by discerning the existence of a location change for the individual reception capability (2). Thus, systems can include a location change assessor for the individual reception capability (2). Any location change can be considered as a potential compromise event and this can be established as a triggered key regeneration capability within the broadcast facility or otherwise. By comparing the signal origination point identification previously received and relied upon with that continuously broadcasted, systems can check for a change in signal origination point identification information and can include a signal origination point identification information change assessor. If such is detected, the system can achieve re-generating a completely unknown decryption key at least partially from the unsecure individualized information. And this time it can be achieved with the new signal origination point identification and its new resulting derived and other keys. In this manner, embodiments can include a nascent decryption key re-generator (10) and other capability that checks for a change in signal origination point identification information. The individual reception capability (2) can have a signal origination point identification information change comparator (44) that can cause re-generation of a new completely unknown decryption key at least partially from the unsecure individualized information. The set-top box (7) can act to re-issue the unsecure individualized information (or even different unsecure individualized information) from the individual reception capability (2) and a resultant unsecure individualized information re-issue command can prompt the entire re-generation process.

With regard to the selection among multiple root key options, it should be understood that multiple options can be provided within the individual reception capability (2) as well. The individual reception capability (2) can be responsive to a number of derived key capabilities. These can be achieved by selecting a derived cryptographic key from among a plurality of derived cryptographic keys for the individual reception capability (2) and by including a derived cryptographic key multiple option selector (47). This can occur at the broadcast facility as well, and there may be a broadcast facility based multiple option derived cryptographic key selector. This can be operable such as when a derived key might have been compromised. By merely selecting one of a plurality of derived keys or other items of information for use in the process, the individual reception capability (2) may simply respond to one of many keys being used.

As can be easily understood from the foregoing, the basic concepts of the present invention may be embodied in a variety of ways. It involves both decryption techniques as well as devices to accomplish the appropriate decryption. In this application, the various techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "receiver" should be understood to encompass disclosure of the act of "receiving"—whether explicitly discussed or not—and, conversely, were there effectively disclosure of the act of "receiving", such a disclosure should be understood to encompass disclosure of a "receiver" and even a "means for receiving" Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference or other information statement filed with or included in the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the cryptographic devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein. In addition and as to computer aspects and each aspect amenable to programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used as permitted in some countries (such as Europe) to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall within the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

LIST OF REFERENCES

I. U.S. PATENT DOCUMENTS

| DOCUMENT NO. & KIND CODE (if known) | PUB'N DATE mm-dd-yyyy | PATENTEE OR APPLICANT NAME |
|---|---|---|
| 3,882,485 | 05-06-1975 | Bluestein et al. |
| 4,090,217 | 05-16-1978 | Goyal et al. |
| 4,531,020 | 07-23-1985 | Wechselberger et al. |
| 4,531,021 | 07-23-1985 | Bluestein et al. |
| 4,613,901 | 09-23-1986 | Gilhousen et al. |
| 5,862,223 | 01-19-1999 | Walker et al. |
| 6,157,719 | 12-05-2000 | Wasilewski et al. |
| 6,272,152 B1 | 08-07-2001 | Levin et al. |
| 6,449,719 B1 | 09-10-2002 | Baker |
| 6,965,993 B2 | 11-15-2005 | Baker |
| 7,007,170 B2 | 02-28-2006 | Morten |
| 7,043,473 B1 | 05-09-2006 | Rassool et al. |
| 7,150,045 B2 | 12-12-2006 | Koelle et al. |
| 7,165,175 B1 | 01-16-2007 | Kollmyer et al. |
| 7,299,292 B2 | 11-20-2007 | Morten et al. |
| 7,328,345 B2 | 02-05-2008 | Morten et al. |
| 7,349,886 B2 | 03-25-2008 | Morten et al. |
| 7,356,143 B2 | 04-08-2008 | Morten |
| 7,376,831 B2 | 05-20-2008 | Kollmyer et al. |
| 7,380,117 B2 | 05-27-2008 | Baker |
| 20060235793 A1 | 10-19-2006 | Walker et al. |
| 20070217436 A1 | 09-20-2007 | Markley et al. |
| 2007067820 A1 | 03-22-2007 | Cha |
| 20070022453 A1 | 01-25-2007 | Cha |
| 20060224510 A1 | 10-05-2006 | Walker et al. |
| 20060224509 A1 | 10-05-2006 | Walker et al. |

II. NON-PATENT LITERATURE DOCUMENTS

FIPS 197, Advanced Encryption Standard (AES), Nov. 26, 2001
ETSI ETR 289: "Digital video Broadcasting (DVB); Support for use of scrambling and Conditional Access (CA) within digital broadcasting systems."
ETSI TR 101 891: "Digital video Broadcasting; Professional Interfaces: Guidelines for implementation and usage of the DVB Asynchronous Serial Interface (ASI)"
ETSI TR 102 035: "Digital Video Broadcasting; Implementation Guidelines of the DVB Simulcrypt standard"
ETSI TS 101 197 (V1.2.1): "Digital Video Broadcasting; DVB Simulcrypt - Head-end architecture and synchronization"
ETSI TS 103 197 (V1.2.1): "Digital Video Broadcasting; Head-end Implementation of DVB Simulcrypt"

-continued

LIST OF REFERENCES

FIPS 140-2; Security Requirements for Cryptographic Modules.
FIPS 180-2; Secure Hash Standard (SHA-1; SHA-256).
FIPS 198; The Keyed-Hash Message Authentication Code.
RFC 1750; Randomness Recommendations for Security.
RFC Key Words
OpenPGP Message Format
OpenCable Common Downoad 2.0 Specification, OC-SP-CDL2.0-I05-071113, Nov. 13, 2007, Cable Television Laboratories, Inc.
PKCS#1 v2.1 RSA Cryptography Standard, RSA Laboratories Jun. 14, 2002
IETF RFC-3268, Advanced Encryption Standard (AES) Cipher Suites for Transport Layer Security (TLS), June 2002
FCC 03-225; Implementation of Section 304 of the Telecommunications Act of 1996, Commercial Availability of Navigation Devices and Compatibility Between Cable Systems and Consumer Electronics Equipment; Oct. 9, 2003.
FIPS SP 800-38A; Recommendation for Block Ciper Modes of Operation - Methods and Techniques.
IETF RFC-2818, *HTTP Over TLS*, May 2000
PGP Message Exchange Formats
OpenPGP Message Format
Emergency Alert Messaging for Cable, SCTE-18, SOCiety of Cable Telecommunications Engineers, 2007.
IETF RFC-4254, The Secure Shell (SHH) Connection Protocol, January 2006.
IETF RFC-4250, The Secure Shell Protocol Assigned Numbers, January 2006.
IETF RFC-2246, *TLS Protocol* - Version 1.0, January 1999.
C. E. Shannon, "A mathematical theory of communication," *Bell System Technical Journal*, vol. 27, pp. 379-423 and 623-656, July and October, 1948
D. Slepian, editor, *Key Papers in the Development of Information Theory*, New York: IEEE Press, 1974.
N. J. A. Sloane and A. D. Wyner, editors, *Claude Elwood Shannon: Collected Papers*, New York: IEEE Press, 1993.
W. Weaver and C. E. Shannon, *The Mathematical Theory of Communication*, Urbana, Illinois: University of Illinois Press, 1949, republished in paperback 1963.

What is claimed is:

1. A method of providing restricted access to an electronic signal comprising steps of:
    establishing a transmission capability for said electronic signal as an encrypted signal;
    establishing an individual reception capability responsive to a completely unknown decryption key unknown to said individual reception capability and said transmission capability;
    providing unsecure individualized information from said individual reception capability;
    nascently generating said completely unknown decryption key that was unknown to said individual reception capability and said transmission capability prior to being nascently generated at least partially from and after providing said unsecure individualized information;
    activating decryption processing of said encrypted signal as a result of said step of nascently generating said completely unknown decryption key; and
    physically unlocking access to said encrypted signal at said individual reception capability.

2. A method of providing restricted access to an electronic signal as described in claim 1 wherein said step of nascently generating said completely unknown decryption key at least partially from said unsecure individualized information comprises a step of adding cryptographic entropy for said decryption key.

3. A method of providing restricted access to an electronic signal as described in claim 2 wherein said step of adding cryptographic entropy for said decryption key comprises a step of utilizing provider information.

4. A method of providing restricted access to an electronic signal as described in claim 3 wherein said step of utilizing provider information to add cryptographic entropy comprises a step of utilizing a secure system wide cryptographic key.

5. A method of providing restricted access to an electronic signal as described in claim 4 wherein said step of nascently generating said completely unknown decryption key at least partially from said unsecure individualized information comprises a step of establishing a cryptographic key using said unsecure individualized information and said secure system wide key as inputs to a cryptographic encryption function.

6. A method of providing restricted access to an electronic signal as described in claim 5 wherein said step of establishing a cryptographic key comprises a step of establishing at least one derived cryptographic key.

7. A method of providing restricted access to an electronic signal as described in claim 5 wherein said step of establishing an individual reception capability comprises a step of establishing an individual reception capability having a security process capability and wherein said step of providing unsecure individualized information from said individual reception capability comprises a step of providing individualized security process capability identification information.

8. A method of providing restricted access to an electronic signal as described in claim 7 wherein said step of establishing an individual reception capability comprises a step of establishing an individual reception capability having a signal process capability and wherein said step of providing unsecure individualized information from said individual reception capability further comprises a step of providing individualized signal process capability identification information.

9. A method of providing restricted access to an electronic signal as described in claim 8 and further comprising a step of transmitting said encrypted signal from a signal origination point transmitter, and wherein said step of utilizing provider information further comprises a step of utilizing signal origination point identification information.

10. A method of providing restricted access to an electronic signal as described in claim 9 wherein said step of nascently generating said completely unknown decryption key at least partially from said unsecure individualized information comprises a step of establishing a cryptographic key using said derived cryptographic key and said signal origination point identification information as inputs to an encryption hash function.

11. A method of providing restricted access to an electronic signal as described in claim 9 wherein said step of nascently generating said completely unknown decryption key at least partially from said unsecure individualized information comprises a step of establishing a cryptographic key using said derived cryptographic key and said signal origination point identification information as inputs to a cryptographic encryption function.

12. A method of providing restricted access to an electronic signal as described in claim 10 wherein said step of establishing a cryptographic key comprises a step of establishing at least one ephemeral cryptographic key.

13. A method of providing restricted access to an electronic signal as described in claim 12 wherein said step of transmitting said encrypted signal from a signal origination point transmitter comprises a step of securely communicating using said at least one ephemeral cryptographic key.

14. A method of providing restricted access to an electronic signal as described in claim 13 and further comprising a step of generating at least one random decryption key.

15. A method of providing restricted access to an electronic signal as described in claim 14 wherein said step of securely communicating using said at least one ephemeral cryptographic key comprises a step of securely sending said at least one random decryption key encrypted by said at least one ephemeral cryptographic key.

16. A method of providing restricted access to an electronic signal as described in claim 15 wherein said step of securely sending said at least one random decryption key encrypted by said at least one ephemeral cryptographic key comprises a step of immediately sending said at least one random decryption key encrypted by said at least one ephemeral cryptographic key.

17. A method of providing restricted access to an electronic signal as described in claim 16 wherein said step of activating decryption processing comprises a step of activating decryption processing based upon said at least one random decryption key.

18. A method of providing restricted access to an electronic signal as described in claim 14 wherein said step of generating at least one random decryption key comprises a step of:
generating a security process capability random cryptographic key; and
generating a signal process capability random cryptographic key.

19. A method of providing restricted access to an electronic signal as described in claim 18 wherein said step of physically unlocking access to said encrypted signal at said individual reception capability comprises a step of allowing continued access to said encrypted signal at said individual reception capability based upon both said security process capability random cryptographic key and said signal process capability random cryptographic key.

20. A method of providing restricted access to an electronic signal as described in claim 1 and further comprising a step of selecting a secure system wide cryptographic key from among a plurality of secure system wide cryptographic keys.

21. A method of providing restricted access to an electronic signal as described in claim 1 wherein said step of establishing an individual reception capability responsive to a completely unknown decryption key comprises a step of establishing a conditional access television device receiver configured to receive an encrypted cable informational service signal.

22. A method of providing restricted access to an electronic signal as described in claim 1 wherein said step of establishing an individual reception capability responsive to a completely unknown decryption key comprises a step of establishing a conditionally operable electronic device configured to receive a service enablement signal, and wherein said step of physically unlocking access to said encrypted signal at said individual reception capability comprises a step of physically unlocking at least some capability for said electronic device as a result of said decryption key.

23. A method of providing restricted access to an electronic signal as described in claim 1 wherein said step of nascently generating said completely unknown decryption key at least partially from said unsecure individualized information comprises a step of generating a cryptographic key by mathematically functioning at least two items of information.

24. A method of providing restricted access to an electronic signal as described in claim 21 wherein said step of nascently generating said completely unknown decryption key at least partially from said unsecure individualized information comprises a step of multi-step mathematically manipulating items to support creation of a cryptographic key.

25. A method of providing restricted access to an electronic signal as described in claim 18 and further comprising a step of assessing continued operability based upon either of said random cryptographic keys.

26. A method of providing restricted access to an electronic signal as described in claim 25 wherein said step of assessing continued operability based upon either of said random cryptographic keys comprises a step of checking for a change in signal origination point identification information.

27. A method of providing restricted access to an electronic signal as described in claim 26 and further comprising a step of re-generating a completely unknown decryption key at least partially from said unsecure individualized information in the event of a change in said signal origination point identification information.

28. A method of providing restricted access to an electronic signal as described in claim 27 wherein said step of re-generating a completely unknown decryption key is accomplished in response to a step of re-issuing said unsecure individualized information from said individual reception capability.

29. A method of providing restricted access to an electronic signal as described in claim 23 and further comprising a step of discerning the existence of a location change for said individual reception capability.

30. A method of providing restricted access to an electronic signal as described in claim 1 wherein said step of nascently generating said completely unknown decryption key at least partially from said unsecure individualized information comprises a step of integrating said unsecure individualized information and provider commonality information into a cryptographic operation.

31. A method of providing restricted access to an electronic signal as described in claim 30 wherein said step of integrating said unsecure individualized information and provider commonality information into a cryptographic operation comprises a step of integrating said unsecure individualized information and secure provider commonality information into a cryptographic operation.

32. A method of providing restricted access to an electronic signal as described in claim 1 wherein said step of nascently generating said completely unknown decryption key at least partially from said unsecure individualized information comprises a step of utilizing multiple unsecure individualized information codes.

33. A method of providing restricted access to an electronic signal as described in claim 32 wherein said step of multiple unsecure individualized information codes comprises a step of:
utilizing a first item of unsecure individualized information in a cryptographic operation; and
utilizing a second item of unsecure individualized information in a cryptographic operation.

34. A method of providing restricted access to an electronic signal as described in claim 33 wherein said step of utilizing a first item of unsecure individualized information in a cryptographic operation comprises a step of providing first process capability individualized identification information.

35. A method of providing restricted access to an electronic signal as described in claim 34 wherein said step of utilizing a second item of unsecure individualized information in a cryptographic operation comprises a step of providing second process capability individualized identification information.

36. A method of providing restricted access to an electronic signal as described in claim 35 wherein said step of providing first process capability individualized identification information comprises a step of providing individualized security process capability identification information.

37. A method of providing restricted access to an electronic signal as described in claim 36 wherein said step of providing second process capability individualized identification information comprises a step of providing individualized signal process capability identification information.

38. A method of providing restricted access to an electronic signal as described in claim 1 wherein said step of nascently generating said completely unknown decryption key from said unsecure individualized information comprises a step of cryptographically operating on said unsecure individualized information as at least part of discerning said completely unknown decryption key.

39. A method of providing restricted access to an electronic signal as described in claim 38 wherein said step of cryptographically operating on said unsecure individualized information as at least part of discerning said completely unknown decryption key comprises a step of cryptographically operating on provider information as at least part of discerning said completely unknown decryption key.

40. A method of providing restricted access to an electronic signal as described in claim 39 wherein said steps of cryptographically operating on said unsecure individualized information as at least part of discerning said completely unknown decryption key and cryptographically operating on said provider information as at least part of discerning said completely unknown decryption key comprises a step of operating an encryption function utilizing said unsecure individualized information and said provider information.

41. A method of providing restricted access to an electronic signal as described in claim 40 wherein said step of utilizing provider information further comprises a step of utilizing signal origination point identification information, and wherein said step of operating an encryption function utilizing said unsecure individualized information and said provider information comprises a step of establishing at least one derived cryptographic key, and wherein said step of nascently generating said completely unknown decryption key from said unsecure individualized information comprises a step of secondarily cryptographically operating on said at least one derived cryptographic key and said signal origination point identification information as at least part of discerning said completely unknown decryption key.

42. A method of providing restricted access to an electronic signal as described in claim 41 wherein said step of secondarily cryptographically operating on said at least one derived cryptographic key and said signal origination point identification information comprises a step of cryptographically hashing said at least one derived cryptographic key and said signal origination point identification information.

43. A method of providing restricted access to an electronic signal as described in claim 42 wherein said step of cryptographically hashing said at least one derived cryptographic key and said signal origination point identification information comprises a step of establishing at least one ephemeral cryptographic key.

44. A method of providing restricted access to an electronic signal as described in claim 41 wherein said step of secondarily cryptographically operating on said at least one derived cryptographic key and said signal origination point identification information comprises a step of cryptographically encrypting said at least one derived cryptographic key together with said signal origination point identification information.

45. A method of providing restricted access to an electronic signal as described in claim 44 wherein said step of cryptographically encrypting said at least one derived cryptographic key together with said signal origination point identification information comprises a step of comprises a step of establishing at least one ephemeral cryptographic key.

46. A method of providing restricted access to an electronic signal as described in claim 43 and further comprising a step of generating at least one random decryption key.

47. A method of providing restricted access to an electronic signal as described in claim 46 and further comprising a step of securely communicating said at least one random decryption key using said at least one ephemeral cryptographic key.

48. A method of providing restricted access to an electronic signal as described in claim 38 and further comprising a step of selecting an item of provider information from among a plurality of secure items of provider information.

49. A method of providing restricted access to an electronic signal as described in claim 48 wherein said step of selecting an item of provider information from among a plurality of secure items of provider information comprises a step of indicating a segment of secure cryptographic code to be utilized.

50. A method of providing restricted access to an electronic signal as described in claim 38 wherein said step of nascently generating said completely unknown decryption key at least partially from said unsecure individualized information comprises a step of utilizing multiple unsecure individualized information codes.

51. A method of providing restricted access to an electronic signal as described in claim 50 wherein said step of multiple unsecure individualized information codes comprises a step of:
　utilizing a first item of unsecure individualized information in a cryptographic operation; and
　utilizing a second item of unsecure individualized information in a cryptographic operation.

52. A method of providing restricted access to an electronic signal as described in claim wherein said step of providing first process capability individualized identification information comprises a step of providing individualized security process capability identification information, and wherein said step of providing second process capability individualized identification information comprises a step of providing individualized signal process capability identification information.

53. A method of providing restricted access to an electronic signal as described in claim 1 and further comprising a step of generating a broadcast facility selected new cipher key for use between said individual reception capability and a broadcast facility.

54. A method of providing restricted access to an electronic signal as described in claim 53 wherein said step of generating a broadcast facility selected new cipher key for use between said individual reception capability and said broadcast facility comprises a step of establishing a potential compromise event triggered key regeneration capability within said broadcast facility.

55. A method of providing restricted access to an electronic signal as described in claim 1 and further comprising a step of securely delivering a conditional access component to said individual reception capability.

56. A method of providing restricted access to an electronic signal as described in claim 55 wherein said step of securely delivering a conditional access component to said individual reception capability comprises a step of activating secure bootloader functionality at said individual reception capability.

57. A method of providing restricted access to an electronic signal as described in claim 20 wherein said step of selecting a secure system wide cryptographic key from among a plurality of secure system wide cryptographic keys comprises a step of selecting a segment of information as a secure system wide cryptographic key.

58. A method of providing restricted access to an electronic signal as described in claim 57 wherein said step of selecting a secure system wide cryptographic key from among a plurality of secure system wide cryptographic keys comprises a step of pointing to a segment of information.

59. A method of providing restricted access to an electronic signal as described in claim 20 wherein said step of selecting a secure system wide cryptographic key from among a plurality of secure system wide cryptographic keys comprises a step of choosing a particular secure system wide cryptographic key from among a plurality of secure system wide cryptographic keys.

60. A method of providing restricted access to an electronic signal as described in claim 1 and further comprising a step of selecting a derived cryptographic key from among a plurality of derived cryptographic keys for said individual reception capability.

61. A method of providing restricted access to an electronic signal as described in claim 60 wherein said step of selecting a derived cryptographic key from among a plurality of derived cryptographic keys for said individual reception capability comprises a step of selecting a segment of information as a derived cryptographic key.

62. A method of providing restricted access to an electronic signal as described in claim 61 wherein said step of selecting a derived cryptographic key from among a plurality of derived cryptographic keys for said individual reception capability comprises a step of pointing to a segment of information.

63. A method of providing restricted access to an electronic signal as described in claim 60 wherein said step of selecting a derived cryptographic key from among a plurality of derived cryptographic keys for said individual reception capability comprises a step of choosing a particular derived cryptographic key from among a plurality of derived cryptographic keys.

64. A method of providing restricted access to an electronic signal as described in claim 60 wherein said step of selecting a derived cryptographic key comprises a step of broadcast facility based selecting a derived cryptographic key from among a plurality of derived cryptographic keys for said individual reception capability.

65. A method of providing restricted access to an electronic signal as described in claim 20 and further comprising a step of selecting a derived cryptographic key from among a plurality of derived cryptographic keys for said individual reception capability.

66. A method of providing restricted access to an electronic signal as described in claim 65 wherein said step of selecting a derived cryptographic key from among a plurality of derived cryptographic keys for said individual reception capability comprises a step of selecting a segment of information as a derived cryptographic key.

67. A method of providing restricted access to an electronic signal as described in claim 66 wherein said step of selecting a derived cryptographic key from among a plurality of derived cryptographic keys for said individual reception capability comprises a step of pointing to a segment of information.

68. A method of providing restricted access to an electronic signal as described in claim 65 wherein said step of selecting a derived cryptographic key from among a plurality of derived cryptographic keys for said individual reception capability comprises a step of choosing a particular derived cryptographic key from among a plurality of derived cryptographic keys.

69. A method of providing restricted access to an electronic signal as described in claim 65 wherein said step of selecting a derived cryptographic key comprises a step of broadcast facility based selecting a derived cryptographic key from among a plurality of derived cryptographic keys for said individual reception capability.

70. A method of providing restricted access to an electronic signal as described in claim 8 wherein said step of establishing an individual reception capability having a signal process capability comprises a steps of:
 establishing an individual reception capability having a security partitioned signal transport capability;
 establishing an individual reception capability having a video signal process capability; and
 establishing an individual reception capability having an audio signal process capability.

71. A method of providing restricted access to an electronic signal as described in claim 70 wherein said step of providing unsecure individualized information comprises a step of providing cable informational service system hardware individualized information.

72. A method of providing restricted access to an electronic signal as described in claim 23 wherein said step of generating said cryptographic key by mathematically functioning at least two items of information comprises a step of utilizing one item of information as a mathematical operand to perform a transformative function on another item of information.

73. A method of providing restricted access to an electronic signal as described in claim 24 wherein said step of multi-step mathematically manipulating items to support creation of a cryptographic key comprises a step selected from a group consisting of:
 manipulating items through a reversible cryptographic function to support creation of a cryptographic key;
 manipulating items through a one-way cryptographic function to support creation of a cryptographic key;
 manipulating items through an encryption function to support creation of a cryptographic key;
 manipulating items through a cryptographic hash function to support creation of a cryptographic key;
 utilizing a random value generator cryptographic function to support creation of a cryptographic key; and
 manipulating items through a data stream location pointer function to support creation of a cryptographic key.

74. A method of providing restricted access to an electronic signal as described in claim 24 wherein said step of multi-step mathematically manipulating items to support creation of a cryptographic key comprises a steps of:
 manipulating items through a reversible cryptographic function to support creation of a cryptographic key; and
 manipulating items through a one-way cryptographic function to support creation of a cryptographic key.

75. A method of providing restricted access to an electronic signal as described in claim 74 wherein said step of manipulating items through a reversible cryptographic function to support creation of a cryptographic key comprises a step of encrypting items to support creation of a cryptographic key, and wherein said step of manipulating items through a one-way cryptographic function to support creation of a cryptographic key comprises a step of cryptographically hashing items to support creation of a cryptographic key.

76. A method of providing restricted access to an electronic signal as described in claim 24 wherein said step of multi-step mathematically manipulating items to support creation of a cryptographic key comprises a steps of:
- manipulating first items through a reversible cryptographic function to support creation of a cryptographic key; and
- manipulating second items through a reversible cryptographic function to support creation of a cryptographic key.

77. A method of providing restricted access to an electronic signal as described in claim 76 wherein said step of manipulating first items through a reversible cryptographic function to support creation of a cryptographic key comprises a step of cryptographically encrypting first items to support creation of a cryptographic key, and wherein said step of manipulating second items through a one-way cryptographic function to support creation of a cryptographic key comprises a step of cryptographically encrypting second items to support creation of a cryptographic key.

78. A method of providing restricted access to an electronic signal as described in claim 75 wherein said step of multi-step mathematically manipulating items to support creation of a cryptographic key comprises a step of subsequently utilizing a random value generator cryptographic function to support creation of a cryptographic key.

79. A method of providing restricted access to an electronic signal as described in claim 78 wherein said step of multi-step mathematically manipulating items to support creation of a cryptographic key comprises a step of manipulating items through a data stream location pointer function to support creation of a cryptographic key.

80. A method of providing restricted access to an electronic signal as described in claim 23 wherein said step of nascently generating said completely unknown decryption key at least partially from said unsecure individualized information comprises a step of generating at least a 128-bit decryption key at least partially from said unsecure individualized information.

81. A method of providing restricted access to an electronic signal as described in claim 2 wherein said step of nascently generating said completely unknown decryption key at least partially from said unsecure individualized information comprises a step of utilizing an at least two dimensional cipher key derivation functionality.

82. A method of providing restricted access to an electronic signal as described in claim 81 wherein said step of utilizing an at least two dimensional cipher key derivation functionality comprises a step of:
- utilizing at least some reception facility information; and
- utilizing at least some broadcast facility information.

83. A method of providing restricted access to an electronic signal as described in claim 82 wherein said step of utilizing at least some reception facility information comprises a step selected from a group consisting of:
- utilizing individualized security process capability identification information;
- utilizing individualized signal process capability identification information; and
- utilizing both individualized security process capability identification information and individualized signal process capability identification information, and wherein said step of utilizing at least some broadcast facility information comprises a step selected from a group consisting of:
- utilizing secure system wide cryptographic key information; and
- utilizing signal origination point identification information; and
- utilizing both secure system wide cryptographic key information and signal origination point identification information.

84. A method of providing restricted access to an electronic signal as described in claim 29 wherein said step of discerning the existence of a location change for said individual reception capability comprises a step of checking for a change in signal origination point identification information.

85. A method of providing restricted access to an electronic signal as described in claim 84 and further comprising a step of re-generating a completely unknown decryption key at least partially from said unsecure individualized information in the event of a change in said signal origination point identification information.

86. A method of providing restricted access to an electronic signal as described in claim 85 wherein said step of re-generating a completely unknown decryption key is accomplished in response to a step of re-issuing said unsecure individualized information from said individual reception capability.

87. A method of providing restricted access to an electronic signal as described in claim 30 wherein said step of integrating said unsecure individualized information and provider commonality information into a cryptographic operation comprises a step of integrating said unsecure individualized information and a selected multiple option secure provider commonality code into a cryptographic operation.

88. A method of providing restricted access to an electronic signal as described in claim 31 wherein said step of integrating said unsecure individualized information and secure provider commonality information into a cryptographic operation comprises a step of integrating said unsecure individualized information and secure hardware provider commonality information into a cryptographic operation.

89. A method of providing restricted access to an electronic signal as described in claim 30 wherein said step of integrating said unsecure individualized information and provider commonality information into a cryptographic operation comprises a step of integrating said unsecure individualized information and service provider commonality information into a cryptographic operation.

90. A method of providing restricted access to an electronic signal as described in claim 30 wherein said step of integrating said unsecure individualized information and provider commonality information into a cryptographic operation comprises a step of integrating said unsecure individualized information and specific transmitter commonality information into a cryptographic operation.

91. A method of providing restricted access to an electronic signal as described in claim 37 wherein said step of providing unsecure individualized information from said individual reception capability comprises a step of unsecurely transmitting both individualized security process capability identification information and individualized signal process capability identification information from said individual reception capability.

92. A method of providing restricted access to an electronic signal as described in claim 1 wherein said step of providing unsecure individualized information from said individual reception capability comprises a step of transmitting cryptographic entropy rate of zero identification information.

93. A method of providing restricted access to an electronic signal as described in claim 1 and further comprising a step of assuring that said completely unknown decryption key is ubiquitously secreted from all persons.

94. A method of providing restricted access to an electronic signal as described in claim 93 wherein said step of assuring that said completely unknown decryption key is ubiquitously secreted from all persons comprises a step of destructively tamper proofing computer chip information within said individual reception capability.

95. A method of providing restricted access to an electronic signal as described in claim 94 wherein said step of assuring that said completely unknown decryption key is ubiquitously secreted from all persons comprises a step of assuring that said completely unknown decryption key is initially unknowable at said broadcast transmission capability.

96. A method of providing restricted access to an electronic signal as described in claim 93 wherein said step of assuring that said completely unknown decryption key is ubiquitously secreted from all persons comprises a step of eliminating any use of a cryptographic trusted authority for said completely unknown decryption key.

97. A method of providing restricted access to an electronic signal as described in claim 96 wherein said step of assuring that said completely unknown decryption key is ubiquitously secreted from all persons comprises a step of assuring that said completely unknown decryption key is initially unknowable at said individual reception capability.

98. A method of providing restricted access to an electronic signal as described in claim 97 wherein said step of assuring that said completely unknown decryption key is initially unknowable at said individual reception capability comprises a step of preventing said individual reception capability from any knowledge as to how said completely unknown decryption key is derived.

99. A method of providing restricted access to an electronic signal as described in claim 38 wherein said step of providing unsecure individualized information from said individual reception capability comprises a step of verbally conveying said unsecure individualized information.

100. A method of providing restricted access to an electronic signal as described in claim 38 and further comprising a step of selecting a derived cryptographic key from among a plurality of derived cryptographic keys for said individual reception capability.

101. A method of providing restricted access to an electronic signal as described in claim 100 wherein said step of selecting a derived cryptographic key comprises a step of broadcast facility based selecting a derived cryptographic key from among a plurality of derived cryptographic keys for said individual reception capability.

102. A method of providing restricted access to an electronic signal as described in claim 48 and further comprising a step of selecting a derived cryptographic key from among a plurality of derived cryptographic keys for said individual reception capability.

103. A method of providing restricted access to an electronic signal as described in claim 102 wherein said step of selecting a derived cryptographic key comprises a step of broadcast facility based selecting a derived cryptographic key from among a plurality of derived cryptographic keys for said individual reception capability.

104. A system for restricted access to an electronic signal comprising:
a transmission facility configured to generate said electronic signal as an encrypted signal;
at least one individual reception capability responsive to a completely unknown decryption key unknown to said individual reception capability and said transmission capability;
an unsecure individualized information transmission to which said transmission facility is responsive;
a nascent decryption key generator responsive after operation of said unsecure individualized information transmission wherein said nascent decryption key generator generates said completely unknown decryption key that was unknown by said individual reception capability and said transmission capability prior to being nascently generated;
a transmitter comprising hardware, wherein said transmitter is responsive to said nascent decryption key generator;
an individual subscriber receiver responsive to said transmitter; and
a subscriber decryption processor responsive to said completely unknown decryption key and configured to physically unlock access to said encrypted signal at said individual reception capability.

105. A system for restricted access to an electronic signal as described in claim 104 wherein said nascent decryption key generator is manipulatively responsive to said unsecure individualized information transmission.

106. A system for restricted access to an electronic signal as described in claim 105 and further comprising an unsecure individualized information generator for said individual reception capability.

107. A system for restricted access to an electronic signal as described in claim 104 wherein said nascent decryption key generator comprises a cryptographic decryption key entropy addition generator.

108. A system for restricted access to an electronic signal as described in claim 107 and further comprising a provider information input to which said nascent decryption key generator is responsive.

109. A system for restricted access to an electronic signal as described in claim 108 wherein said provider information input comprises a secure system wide cryptographic key input.

110. A system for restricted access to an electronic signal as described in claim 109 and further comprising:
a unsecure individualized information input; and
a secure system wide key input, and wherein said nascent decryption key generator comprises a cryptographic encryption processor responsive to said unsecure individualized information input and said secure system wide key input.

111. A system for restricted access to an electronic signal as described in claim 110 wherein said cryptographic encryption processor comprises at least one derived cryptographic key.

112. A system for restricted access to an electronic signal as described in claim 110 wherein said individual reception capability comprises a security processor, and wherein said unsecure individualized information transmission comprises an individualized security process capability identification information transmission.

113. A system for restricted access to an electronic signal as described in claim 112 wherein said individual reception capability further comprises a signal processor, and wherein said unsecure individualized information transmission comprises an individualized signal process capability identification information transmission.

114. A system for restricted access to an electronic signal as described in claim 113 and further comprising a signal origination point information transmitter, and wherein said provider information input further comprises a signal origination point identification information input.

115. A system for restricted access to an electronic signal as described in claim 114 and further comprising:

a signal origination point identification information input to which said nascent decryption key generator is responsive;

at least one derived key input to which said nascent decryption key generator is responsive, and wherein said nascent decryption key generator comprises an encryption hash function processor responsive to said signal origination point identification information input and said at least one derived key input.

116. A system for restricted access to an electronic signal as described in claim 114 and further comprising:

a signal origination point identification information input to which said nascent decryption key generator is responsive;

at least one derived key input to which said nascent decryption key generator is responsive, and wherein said nascent decryption key generator comprises a cryptographic encryption function processor responsive to said signal origination point identification information input and said at least one derived key input.

117. A system for restricted access to an electronic signal as described in claim 115 wherein said nascent decryption key generator establishes at least one ephemeral cryptographic key.

118. A system for restricted access to an electronic signal as described in claim 117 wherein said signal origination point information transmitter is responsive to said at least one ephemeral cryptographic key.

119. A system for restricted access to an electronic signal as described in claim 118 and further comprising at least one random decryption key generator.

120. A system for restricted access to an electronic signal as described in claim 119 wherein said nascent decryption key generator comprises a secure random decryption key transmitter cryptographically responsive to said at least one ephemeral cryptographic key and said at least one random decryption key generator.

121. A system for restricted access to an electronic signal as described in claim 120 wherein said secure random decryption key transmitter is configured to serve as a transient ephemeral cryptographic key based secure random decryption key transmitter.

122. A system for restricted access to an electronic signal as described in claim 121 wherein said subscriber decryption processor comprises an enduring operation random decryption key based decryption processor.

123. A system for restricted access to an electronic signal as described in claim 119 wherein said at least one random decryption key generator comprises:

a security process capability random cryptographic key generator; and a signal process capability random cryptographic key generator.

124. A system for restricted access to an electronic signal as described in claim 104 and further comprising a secure system wide cryptographic key multiple option selector.

125. A system for restricted access to an electronic signal as described in claim 104 wherein said comprises an at least dual information input mathematically functional cryptographic key generator.

126. A system for restricted access to an electronic signal as described in claim 104 wherein said nascent decryption key generator comprises a multi-step mathematically functional cryptographic key generator.

127. A system for restricted access to an electronic signal as described in claim 107 wherein said nascent decryption key generator comprises an at least two dimensional cipher key derivation processor.

128. A system for restricted access to an electronic signal as described in claim 127 wherein said at least two dimensional cipher key derivation processor comprises:

at least some reception facility information input; and at least some broadcast facility information input.

129. A system for restricted access to an electronic signal as described in claim 128 wherein said at least some reception facility information input is selected from a group consisting of:

an individualized security process capability identification information input;

an individualized signal process capability identification information input; and both an individualized security process capability identification information input and an individualized signal process capability identification information input, and wherein said at least some broadcast facility information input is selected from a group consisting of:

a secure system wide cryptographic key information input;

a signal origination point identification information input; and both a secure system wide cryptographic key information input and a signal origination point identification information input.

130. A system for restricted access to an electronic signal as described in claim 104 and further comprising a potential key compromise assessor.

131. A system for restricted access to an electronic signal as described in claim 130 wherein said potential key compromise assessor comprises a signal origination point identification information change assessor.

132. A system for restricted access to an electronic signal as described in claim 131 and further comprising a nascent decryption key re-generator responsive to an unsecure individualized information transmission and said signal origination point identification information change comparator.

133. A system for restricted access to an electronic signal as described in claim 132 wherein said nascent decryption key re-generator comprises an unsecure individualized information re-issue command.

134. A system for restricted access to an electronic signal as described in claim 125 and further comprising a location change assessor for said individual reception capability.

135. A system for restricted access to an electronic signal as described in claim 104 wherein said nascent decryption key generator comprises an individualized information cryptographic transformation processor.

136. A system for restricted access to an electronic signal as described in claim 135 wherein said individualized information cryptographic transformation processor further comprises a provider information cryptographic transformation processor.

137. A system for restricted access to an electronic signal as described in claim 136 wherein said cryptographic transformation processor comprises an encryption operation function processor.

138. A system for restricted access to an electronic signal as described in claim 137 wherein said nascent decryption key generator comprises a secondary provider information cryptographic transformation processor.

139. A system for restricted access to an electronic signal as described in claim 138 wherein said secondary provider information cryptographic transformation processor comprises an encryption hash function processor.

140. A system for restricted access to an electronic signal as described in claim 139 wherein said nascent decryption key generator comprises at least one ephemeral cryptographic key generator.

141. A system for restricted access to an electronic signal as described in claim 138 wherein said secondary provider information cryptographic transformation processor comprises a cryptographic encryption function processor.

142. A system for restricted access to an electronic signal as described in claim 140 wherein said cryptographic encryption function processor comprises at least one ephemeral cryptographic key generator.

143. A system for restricted access to an electronic signal as described in claim 140 and further comprising a random decryption key generator.

144. A system for restricted access to an electronic signal as described in claim 143 and further comprising a secure decryption key transmitter cryptographically responsive to said at least one ephemeral cryptographic key generator and configured to transmit a random decryption key.

145. A system for restricted access to an electronic signal as described in claim 135 and further comprising a secure system wide cryptographic key multiple option selector.

146. A system for restricted access to an electronic signal as described in claim 135 wherein said unsecure individualized information transmission comprises a multiple unsecure individualized information code transmission.

147. A system for restricted access to an electronic signal as described in claim 146 wherein said multiple unsecure individualized information code transmission comprises:
   a first item of unsecure individualized information transmission; and
   a second item of unsecure individualized information transmission.

148. A system for restricted access to an electronic signal as described in claim 147 wherein said first item of unsecure individualized information transmission comprises a first process capability individualized identification information transmission, and wherein said second item of unsecure individualized information transmission comprises a second process capability individualized identification information transmission.

149. A system for restricted access to an electronic signal as described in claim 123 wherein said subscriber decryption processor comprises:
   an enduring operation security process capability random cryptographic key based decryption processor; and
   an enduring operation signal process capability random cryptographic key based decryption processor.

150. A system for restricted access to an electronic signal as described in claim 124 wherein said provider information input comprises a segmented secure system wide cryptographic key.

151. A system for restricted access to an electronic signal as described in claim 150 wherein said secure system wide cryptographic key multiple option selector comprises a segmented interdata pointer.

152. A system for restricted access to an electronic signal as described in claim 124 wherein said provider information input comprises a chosen secure system wide cryptographic key.

153. A system for restricted access to an electronic signal as described in claim 104 and further comprising a derived cryptographic key multiple option selector.

154. A system for restricted access to an electronic signal as described in claim 153 wherein said provider information input comprises a segmented derived cryptographic key.

155. A system for restricted access to an electronic signal as described in claim 154 wherein said derived cryptographic key multiple option selector comprises a segmented interdata pointer.

156. A system for restricted access to an electronic signal as described in claim 153 wherein said provider information input comprises a chosen derived cryptographic key.

157. A system for restricted access to an electronic signal as described in claim 153 wherein said derived cryptographic key multiple option selector comprises a broadcast facility based multiple option derived cryptographic key selector.

158. A system for restricted access to an electronic signal as described in claim 124 and further comprising a derived cryptographic key multiple option selector.

159. A system for restricted access to an electronic signal as described in claim 158 wherein said provider information input comprises a segmented derived cryptographic key.

160. A system for restricted access to an electronic signal as described in claim 159 wherein said derived cryptographic key multiple option selector comprises a segmented interdata pointer.

161. A system for restricted access to an electronic signal as described in claim 158 wherein said provider information input comprises a chosen derived cryptographic key.

162. A system for restricted access to an electronic signal as described in claim 158 wherein said derived cryptographic key multiple option selector comprises a broadcast facility based multiple option derived cryptographic key selector.

163. A system for restricted access to an electronic signal as described in claim 104 wherein said broadcast transmission facility comprises a cable informational service signal origination point facility for an encrypted cable informational service signal, and wherein said at least one individual reception capability comprises a conditional access television device receiver configured to receive said encrypted cable informational service signal.

164. A system for restricted access to an electronic signal as described in claim 113 wherein said signal processor comprises:
   a security partitioned signal transport capability;
   a video signal process capability; and
   an audio signal process capability.

165. A system for restricted access to an electronic signal as described in claim 164 wherein said unsecure individualized information transmission comprises a cable informational service system hardware individualized information transmission.

166. A system for restricted access to an electronic signal as described in claim 104 wherein said broadcast transmission facility comprises an electronic device enabling facility, and wherein said at least one individual reception capability comprises conditionally operable electronic device configured to receive a service enablement signal.

167. A system for restricted access to an electronic signal as described in claim 125 wherein said at least dual information input mathematically functional cryptographic key generator comprises:
   a first informational input mathematical operand processor; and
   a second informational input transformative function processor.

168. A system for restricted access to an electronic signal as described in claim 126 wherein said multi-step mathematically functional cryptographic key generator is selected from a group consisting of:
- a reversible cryptographic function key generator;
- a one-way cryptographic function key generator;
- an encryption function key generator;
- a cryptographic hash function key generator;
- a random cryptographic key generator; and
- a data stream location pointer function key generator.

169. A system for restricted access to an electronic signal as described in claim 126 wherein said multi-step mathematically functional cryptographic key generator comprises:
- a reversible cryptographic function key generator; and
- a one-way cryptographic function key generator.

170. A system for restricted access to an electronic signal as described in claim 169 wherein said reversible cryptographic function key generator comprises an encryption function key generator, and wherein said one-way cryptographic function key generator comprises a cryptographic hash function key generator.

171. A system for restricted access to an electronic signal as described in claim 126 wherein said multi-step mathematically functional cryptographic key generator comprises:
- a first reversible cryptographic function key generator; and
- a second reversible cryptographic function key generator.

172. A system for restricted access to an electronic signal as described in claim 171 wherein said first reversible cryptographic function key generator comprises a first cryptographic encryption function key generator, and wherein said second reversible cryptographic function key generator comprises a second cryptographic encryption function key generator.

173. A system for restricted access to an electronic signal as described in claim 170 wherein said multi-step mathematically functional cryptographic key generator comprises a random cryptographic key generator.

174. A system for restricted access to an electronic signal as described in claim 173 wherein said multi-step mathematically functional cryptographic key generator comprises a data stream location pointer function key generator.

175. A system for restricted access to an electronic signal as described in claim 125 wherein said nascent decryption key generator comprises an at least 128-bit decryption key generator.

176. A system for restricted access to an electronic signal as described in claim 134 wherein said location change assessor comprises a signal origination point identification information change comparator.

177. A system for restricted access to an electronic signal as described in claim 176 and further comprising nascent decryption key re-generator responsive to said signal origination point identification information change comparator.

178. A system for restricted access to an electronic signal as described in claim 177 and further comprising an unsecure individualized information re-issue command responsive to said signal origination point identification information change comparator, and wherein said nascent decryption key re-generator is responsive said unsecure individualized information re-issue command.

179. A system for restricted access to an electronic signal as described in claim 104 wherein said nascent decryption key generator comprises a cryptographic provider commonality information integrator responsive to provider commonality information and said cryptographic unsecure individualized information.

180. A system for restricted access to an electronic signal as described in claim 179 wherein said cryptographic provider commonality information integrator comprises a multiple option secure provider commonality code selector.

181. A system for restricted access to an electronic signal as described in claim 179 wherein said cryptographic provider commonality information integrator comprises a unsecure individualized information and secure provider commonality information cryptographic integrator.

182. A system for restricted access to an electronic signal as described in claim 181 wherein said an unsecure individualized information and secure provider commonality information cryptographic integrator comprises an unsecure individualized information and secure hardware provider commonality information cryptographic integrator.

183. A system for restricted access to an electronic signal as described in claim 179 wherein said cryptographic provider commonality information integrator comprises an unsecure individualized information and service provider commonality information cryptographic integrator.

184. A system for restricted access to an electronic signal as described in claim 179 wherein said cryptographic provider commonality information integrator comprises an unsecure individualized information and specific transmitter commonality information cryptographic integrator.

185. A system for restricted access to an electronic signal as described in claim 104 wherein said unsecure individualized information transmission comprises a multiple unsecure individualized information code transmission.

186. A system for restricted access to an electronic signal as described in claim 185 wherein said multiple unsecure individualized information code transmission comprises:
- a first item of unsecure individualized information transmission; and
- a second item of unsecure individualized information transmission.

187. A system for restricted access to an electronic signal as described in claim 186 wherein said a first item of unsecure individualized information transmission comprises a first process capability individualized identification information transmission.

188. A system for restricted access to an electronic signal as described in claim 187 wherein said second item of unsecure individualized information transmission comprises a second process capability individualized identification information transmission.

189. A system for restricted access to an electronic signal as described in claim 188 wherein said first process capability individualized identification information transmission comprises an individualized security process capability identification information transmission.

190. A system for restricted access to an electronic signal as described in claim 189 wherein said second item of unsecure individualized information transmission comprises an individualized signal process capability identification information transmission.

191. A system for restricted access to an electronic signal as described in claim 190 wherein said multiple unsecure individualized information code transmission comprises:
- an individualized security process capability identification information transmission from said individual reception capability; and
- an individualized signal process capability identification information transmission from said individual reception capability.

192. A system for restricted access to an electronic signal as described in claim 104 wherein said multiple unsecure individualized information code transmission comprises an entropy rate of zero identification information transmission.

193. A system for restricted access to an electronic signal as described in claim 145 wherein said secure system wide cryptographic key multiple option selector comprises a segmented interdata pointer.

194. A system for restricted access to an electronic signal as described in claim 135 wherein said unsecure individualized information transmission comprises an unsecure verbal individualized information transmission.

195. A system for restricted access to an electronic signal as described in claim 135 and further comprising a derived cryptographic key multiple option selector.

196. A system for restricted access to an electronic signal as described in claim 195 wherein said derived cryptographic key multiple option selector comprises a broadcast facility based multiple option derived cryptographic key selector.

197. A system for restricted access to an electronic signal as described in claim 145 and further comprising a derived cryptographic key multiple option selector.

198. A system for restricted access to an electronic signal as described in claim 197 wherein said derived cryptographic key multiple option selector comprises a broadcast facility based multiple option derived cryptographic key selector.

199. A system for restricted access to an electronic signal as described in claim 104 and further comprising a broadcast transmission capability prompted nascent decryption key re-generator.

200. A system for restricted access to an electronic signal as described in claim 199 and further comprising a potential key compromise assessor to which said broadcast transmission capability prompted nascent decryption key re-generator is responsive.

201. A system for restricted access to an electronic signal as described in claim 104 and further comprising a conditional access component transmitter to which said individual reception capability is operationally responsive.

202. A system for restricted access to an electronic signal as described in claim 201 wherein said conditional access component transmitter comprises secure bootloader.

\* \* \* \* \*